(12) United States Patent  
Helfrich

(10) Patent No.: US 9,066,211 B2  
(45) Date of Patent: *Jun. 23, 2015

(54) DECISION SUPPORT

(71) Applicant: Blueforce Development Corporation, Salem, MA (US)

(72) Inventor: Michael Helfrich, Salem, MA (US)

(73) Assignee: Blueforce Development Corporation, Newburyport (*) Notice: Subject to any disclaimer, the term of this patent is extended or adjusted under 35 U.S.C. 154(b) by 0 days.

This patent is subject to a terminal disclaimer.

(21) Appl. No.: 14/174,019

(22) Filed: Feb. 6, 2014

(65) Prior Publication Data

US 2014/0155087 A1 Jun. 5, 2014

Related U.S. Application Data

(63) Continuation of application No. 13/894,938, filed on May 15, 2013, now Pat. No. 8,682,309, which is a continuation of application No. 13/315,757, filed on Dec. 9, 2011, now Pat. No. 8,467,779.

(60) Provisional application No. 61/421,880, filed on Dec. 10, 2010.

(51) Int. Cl.  
*H04M 3/00* (2006.01)  
*H04W 4/08* (2009.01)  
(Continued)

(52) U.S. Cl.  
CPC .............. *H04W 4/08* (2013.01); *H04W 4/005* (2013.01); *H04W 84/18* (2013.01); *H04W 12/08* (2013.01); *H04L 67/34* (2013.01); *H04L 67/125* (2013.01); *H04L 67/12* (2013.01); *H04W 4/02* (2013.01)

(58) Field of Classification Search  
CPC ......... H04W 4/08; H04W 4/02; H04W 12/08; H04W 4/005; H04W 84/18; H04L 67/12; H04L 67/125; H04L 67/34

USPC ............ 455/418–420, 410–411, 41.2, 550.1, 455/556.1–557

See application file for complete search history.

(56) References Cited

U.S. PATENT DOCUMENTS 5,081,667 A 1/1992 Drori et al.  
5,461,390 A 10/1995 Hoshen  
(Continued)

FOREIGN PATENT DOCUMENTS

WO 2008022423 A2 2/2008  
WO 2008027750 A2 3/2008  
WO 2012078983 A2 6/2012

OTHER PUBLICATIONS

International Preliminary Report on Patentability for international patent application PCT/US2011/064156, issued by WIPO in Geneva on Feb. 3, 2015 (7 pages).

(Continued)

*Primary Examiner* — Sharad Rampuria  
(74) *Attorney, Agent, or Firm* — Brown Rudnick LLP

(57) ABSTRACT

Decision support information is exchanged over a secure wireless network among mobile computing devices, and also optionally a central command computer. Each of the mobile computing devices has one or more sensors connected and interfaced to it. Output data from the sensor(s) can be sent over the network to one or more other devices on the network. A command for a sensor also can be sent over the network to cause the sensor to take some action such as turning on or turning off. The mobile computing devices on the network automatically share plug-in software components needed by any of the devices to view transmitted sensor output data and/or act on sensor commands.

16 Claims, 14 Drawing Sheets

(51) Int. Cl.
*H04W 4/00* (2009.01)
*H04W 12/08* (2009.01)
*H04W 4/02* (2009.01)
*H04W 84/18* (2009.01)
*H04L 29/08* (2006.01)

(56) References Cited

U.S. PATENT DOCUMENTS

| | | |
|---|---|---|
| 5,493,692 A | 2/1996 | Theimer et al. |
| 6,621,413 B1 | 9/2003 | Roman et al. |
| 7,003,335 B2 * | 2/2006 | Briancon ............... 455/575.6 |
| 7,024,228 B2 | 4/2006 | Komsi et al. |
| 7,091,852 B2 | 8/2006 | Mason et al. |
| 7,136,059 B2 | 11/2006 | Kraus et al. |
| 7,139,562 B2 | 11/2006 | Matsui |
| 7,171,331 B2 | 1/2007 | Vock et al. |
| 7,245,216 B2 | 7/2007 | Burkley et al. |
| 7,271,720 B2 | 9/2007 | Tabe |
| 7,283,904 B2 | 10/2007 | Benjamin et al. |
| 7,359,723 B2 * | 4/2008 | Jones ......................... 455/466 |
| 7,363,031 B1 | 4/2008 | Aisa |
| 7,440,767 B2 | 10/2008 | Ballay et al. |
| 7,502,619 B1 | 3/2009 | Katz |
| 7,536,170 B2 | 5/2009 | Goldman et al. |
| 7,565,132 B2 | 7/2009 | Ben Ayed |
| 7,627,334 B2 | 12/2009 | Cohen et al. |
| 7,629,880 B2 | 12/2009 | Stilp et al. |
| 7,786,891 B2 | 8/2010 | Owens et al. |
| 7,894,849 B2 | 2/2011 | Kass et al. |
| 7,899,439 B2 | 3/2011 | Hibino |
| 7,917,167 B1 | 3/2011 | Fujisaki |
| 8,026,791 B2 | 9/2011 | Kreiner et al. |
| 8,233,463 B2 | 7/2012 | Yang |
| 8,270,937 B2 | 9/2012 | Evans et al. |
| 8,279,067 B2 | 10/2012 | Berger et al. |
| 8,311,480 B2 | 11/2012 | Nagata et al. |
| 8,380,160 B2 | 2/2013 | Monks et al. |
| 2001/0031997 A1 | 10/2001 | Lee |
| 2002/0193080 A1 | 12/2002 | Komsi et al. |
| 2009/0174547 A1 | 7/2009 | Greene et al. |
| 2009/0217080 A1 | 8/2009 | Ferguson et al. |
| 2009/0300525 A1 | 12/2009 | Jolliff et al. |
| 2011/0019587 A1 | 1/2011 | Wang |
| 2011/0050428 A1 | 3/2011 | Istoc |
| 2011/0171946 A1 * | 7/2011 | Soehren .................... 455/418 |
| 2013/0052978 A1 | 2/2013 | Sabin |

OTHER PUBLICATIONS

International Search Report for PCT/US11/64156 with the date of mailing of Jan. 16, 2015 (2 pages).

* cited by examiner

DECISION SUPPORT

CROSS-REFERENCE TO RELATED APPLICATION

This is a continuation of U.S. patent application Ser. No. 13/894,938, filed on May 15, 2013, which is a continuation of U.S. patent application Ser. No. 13/315,757, filed on Dec. 9, 2011 (now U.S. Pat. No. 8,467,779), which claims priority to and the benefit of Provisional U.S. Patent Application Ser. No. 61/421,880, filed on Dec. 10, 2010, and the entirety of each of these is incorporated herein by reference.

TECHNICAL FIELD

The invention generally relates to the exchange of decision support information among mobile computing devices over a wireless network.

BACKGROUND INFORMATION

The ability to communicate and share information is necessary to accomplish a purpose or a task that requires a collaborative effort. Current use of mobile computing devices, such as smartphones, between collaborators involves communication in the form of verbal, message, and file exchanges. These communications, however, often fail to provide the complete context and perspective of each collaborator's current status. For example, such communications often lack detailed information about a collaborator's health, surrounding environment, or both. Such perspective and context is necessary for superior decision making to mitigate, prepare for, respond to, and overcome problems that arise on the individual and team level. Further, verbal and message exchanges as well as manual file transfers are impractical, unsecure, and time consuming. Moreover, such communications over mobile computing devices are often not an option in high pressure or confidential collaborations, such as a military operation. Communications between mobile computing devices are subject to potential interception. Interception defeats any confidentiality and security, and ultimately may lead to a failed mission. Therefore, there is a need for a communication system that allows communication and information sharing between collaborators that provides complete context and perspective on the individual and team level that is also practical, secure, and in real-time.

SUMMARY invention relates to the exchange of decision support information among collaborators in a way that provides complete context and perspective on the individual and team level. A communication system of the present invention overcomes the deficiencies of current communications among collaborators by providing real-time, secure, and adaptive information sharing that further includes the integration of sensor data. Communication systems according to the invention provide for sensor data exchange and execution of commands via a secure wireless network in order to enhance communications and decision-making among remote collaborators. In one aspect, the secure wireless network includes a central command computer and one or more mobile computing devices. In another aspect, the secure wireless network is formed from a plurality of mobile computing devices, without a central command computer.

Each mobile computing device is connected and interfaced to a plurality of sensors. Any mobile computing device communicating over the secure wireless network may receive sensor output data from its connected sensors, transmit at least some of the sensor output data to one or more mobile computing devices in the network, and receive sensor output data from one or more other mobile computing devices in the network.

A mobile computing device may also receive a sensor command over the secure wireless network from the central command computer, another mobile computing device, or both. Upon receipt of the command, the mobile computing device relays the command to one of its sensors, and that sensor performs the function dictated by the received command. The function can be, for example, turning on, turning off, taking a reading, or movement.

In order to view sensor output data on a display of a mobile computing device, the invention provides for auto-distribution of plug-in components that allows viewing of any sensor's output data. When a mobile computing device does not have a plug-in component needed to communicate with any sensor, the mobile computing device automatically receives the requisite plug-in over the secure wireless network. The auto-distribution of plug-in viewer components over the network allows seamless communication among connected mobile computing devices without the need for each device to have pre-downloaded all of the same plug-ins as each communicating mobile computing devices in the network.

If a central command computer is used, that command computer can be, for example, a laptop computer, a desktop computer, or a server computer. Each of the mobile computing devices can be, for example, a tablet computer or a cellular phone such as a smart phone. In addition to exchanging sensor output data and sensor commands over the network, the mobile computing devices can be used to communicate traditionally, in the form of calls, emails, and texts, with other mobile computing devices over the network.

The sensors connected and interfaced to the mobile computing devices provide information about a user of the mobile computing device and/or about the surrounding environment of the mobile computing device. In one embodiment, the sensor provides sensor output data representative of a location of the mobile computing device. The location may include the device's geospatial location, such as the device's longitude, latitude, and altitude. The sensor output data may also represent a mobile computing device's location with respect to a wireless access point device from which the mobile computing device is receiving wireless signals. The location may also be with respect to a device that produces a wireless beacon from which the mobile computing device is receiving wireless signal. The location sensor output data may represent the distance of the mobile computing device from either the wireless access point device or the device that produces a wireless beacon. In addition, at least one of the sensors connected and interfaced with a mobile computing device may provide sensor output data representative of a trajectory of the mobile computing device as it is moving or has moved.

Other sensors can provide sensor output data representative of a physiological aspect of a person carrying the mobile computing device, and the physiological aspect may include the person's heart rate. Another sensor may provide sensor output data representative of the environmental conditions surrounding the mobile computing device, such as the quality of the air in the vicinity of the mobile computing device.

DESCRIPTION

A communication system of the invention provides the ability to exchange decision support information in order to accomplish a purpose or task of a collaborative effort. The communication system allows collaborators that are connected to a secure wireless network to communicate verbally, exchange data, including files, messages, and sensor output data, and execute commands using mobile computing (MC) devices. Each of the MC devices used in the communication system is typically connected and interfaced with at least one sensor. The collected sensor data can be shared among one or more of the other collaborating devices in the network to provide an additional layer of information sharing that allows for optimal decision support.

In some embodiments, the communication system includes a central command computer communicating with one or more MC devices. In one aspect, the communication system only comprises communications among MC devices, without a central command computer. Central command computers embodied in the invention include a laptop computer, a desktop computer, or a server computer. MC devices in the network can include cellular phones such as smart phones, tablet computers, and/or any other hand-held computing devices that are capable of wireless communication.

The user of the MC device 110 may be an autonomous, unattended, and/or carbon-based entity. For example, the user can be an unmanned aerial vehicle, a dog, or a person. For example, a dog can have a vest containing a smart phone, a camera sensor, and a chemical sensor, and the vest-mounted sensors can be connected and interfaced with the vest-mounted smart phone. The smart phone on the vest can communicate with another MC device (such as another smart phone) or a central command computer operated by a person. In a search and rescue operation, the dog may be sent into a collapsed building. The camera will take pictures of the dog's surrounding environment, and the chemical sensor will collect data about the air quality, for example. Both sensors will relay the information to the dog's MC device, and the dog's MC device then will transmit the information over the secure wireless network to the person's MC device or the person's command computer. Equipped with the information communicated from the dog's MC device, the person can make an informed decision on how to proceed with the search and rescue.

Figure 1:
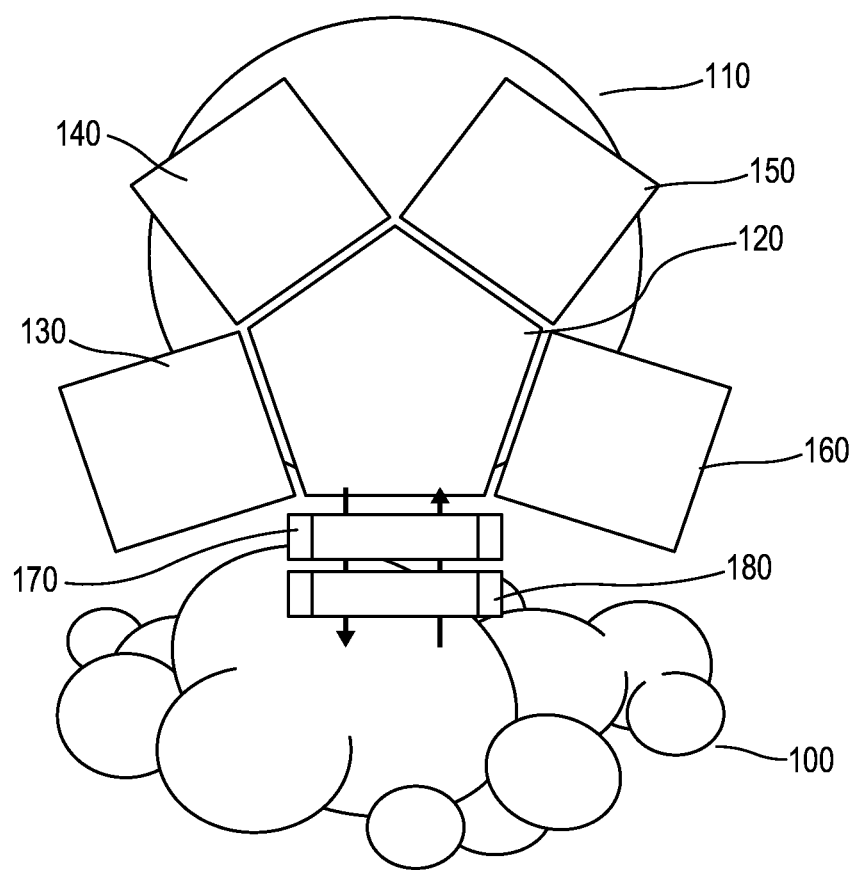
FIG. 1 depicts a mobile computing device that can communicate over a secure wireless network.
Figure 9:
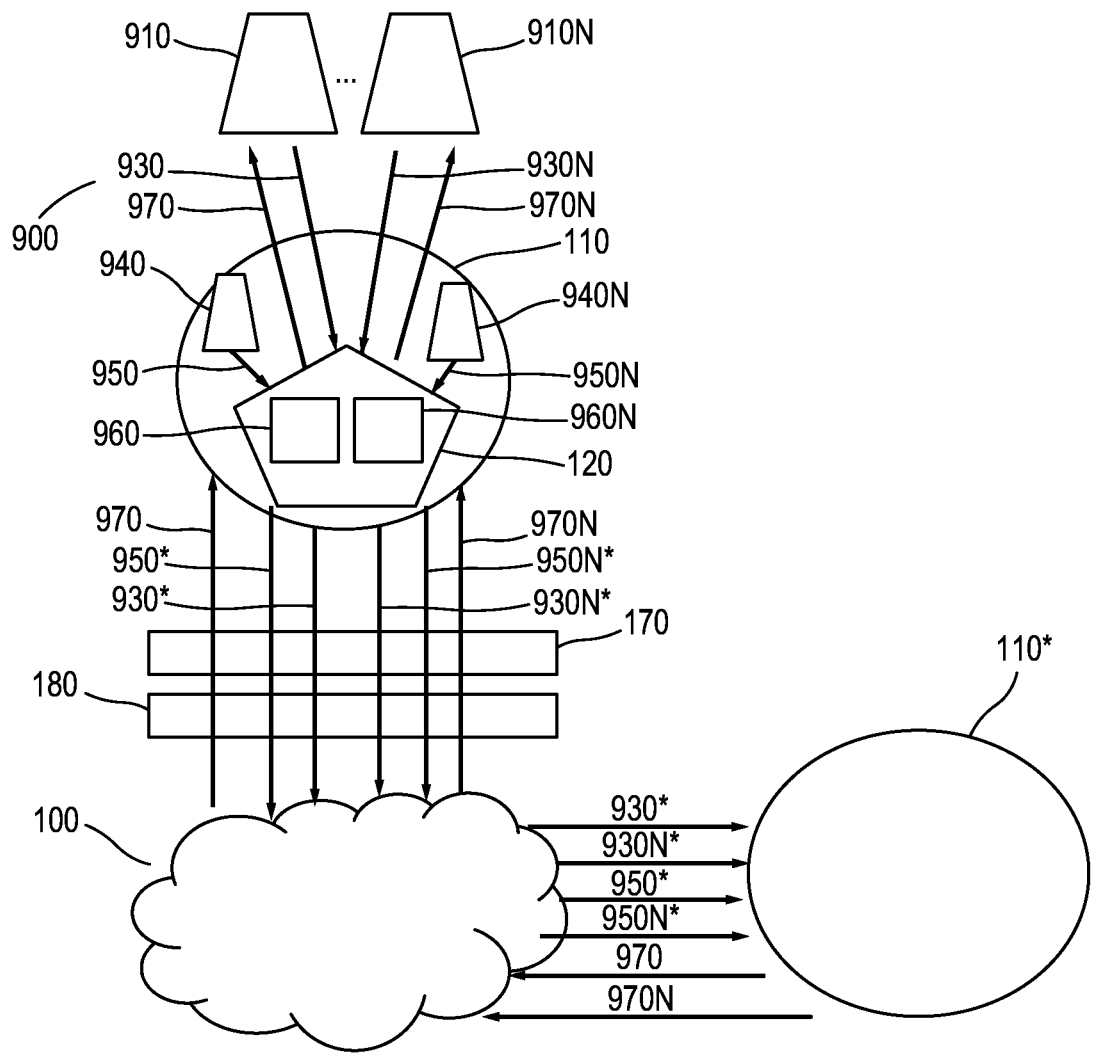
FIG. 9 depicts transmission of sensor output data from a sensor to a connected and interfaced mobile computing device, transmission of such sensor output data over the secure wireless network to another mobile computing device, and transmission of commands to sensors of a mobile computing device from another mobile computing device.

FIG. 1 depicts a MC device 110 of the communication system. The MC device executes a software application that enables the user to share decision support information to other team members utilizing a computing device on the network. The MC device 110 has a processor and computer readable storage containing processor-executable instructions. These instructions are the above-mentioned software application. The software application, when executed on an MC device that is part of the larger communication system which contains one or more other MC devices and also one or more optional central command computers, causes the MC device to perform the functions of a fusion engine 120. The MC device 110 communicates to other MC devices over a secure wireless network 100. Security measures enforced by the fusion engine 120 are placed on all communications transmitted in or out of the MC device 110. The security measures can include a subscription process 180, an encryption process 170, or both. Location sensors 130, environmental sensors 140, health sensors 150, and trajectory sensors 160 represent some of the categories of sensors 910-910N (as shown in FIG. 9) that can be connected and interfaced with an MC device 110 to provide information about the user of an MC device 110, the environment of the MC device 110, and/or the MC device 110 itself.

Figure 2:
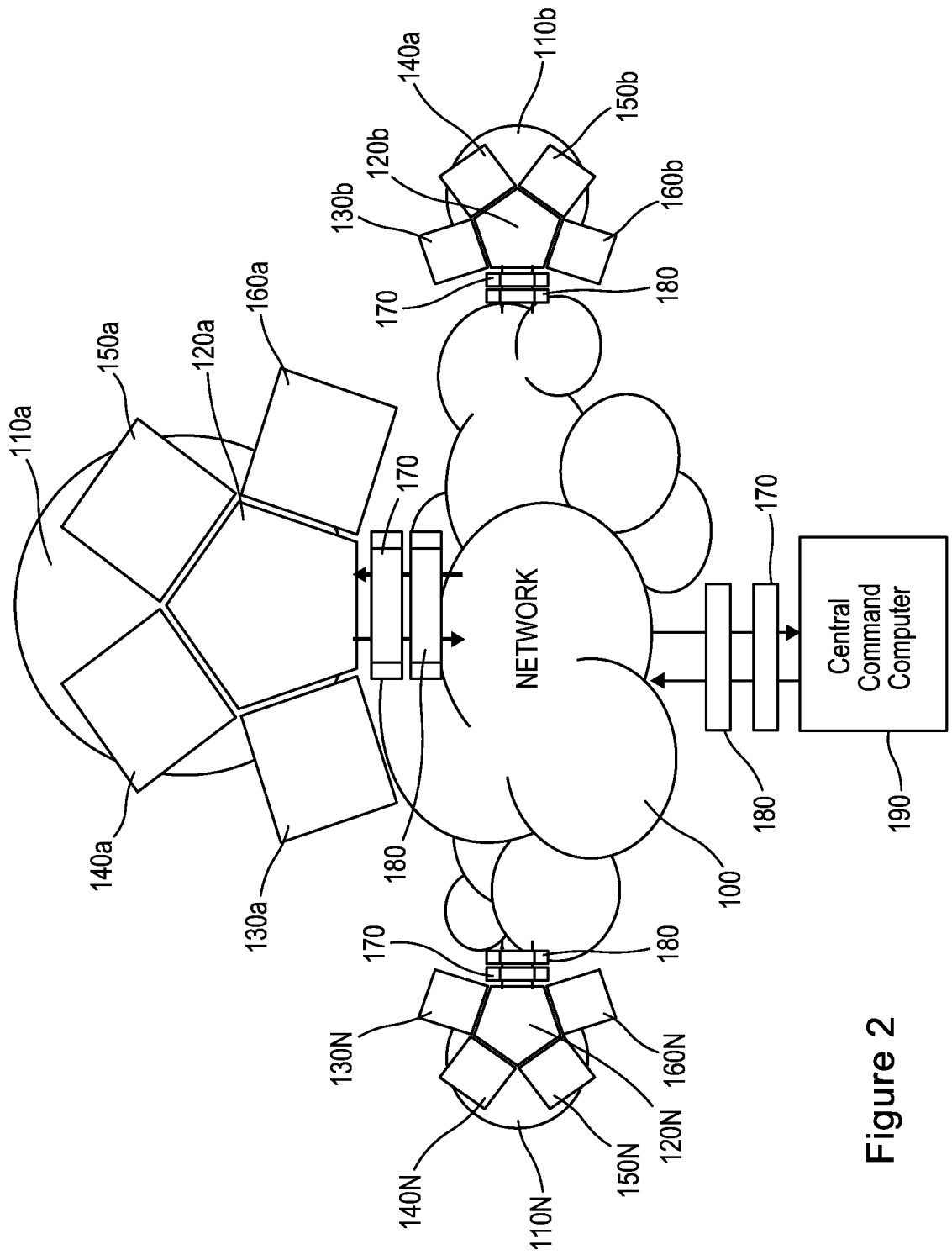
FIG. 2 depicts a communication system according to the invention including a central command computer and three of the mobile computing devices of FIG. 1 communicating over the secure wireless network.

FIG. 2 is a schematic diagram of communication among MC devices and a central command computer within a communication system according to the invention. As shown in FIG. 2, MC devices 110a, 110b, . . . 110N and a central command computer 190 are communicating over the secure wireless network 100. The secure wireless network 100 is formed as a result of a subscription process 180 and an encryption process 170 that each of the MC devices 110a, 110b, . . . 110N performs. The secure wireless network expands and contracts as an ad-hoc workgroup network depending on the number of MC devices that subscribe to other MC devices in the network. The MC devices 110a, 110b, . . . 110N are connected and interfaced with sensors that provide information about a user of the corresponding MC device and information about the MC device itself. Location sensors 130a, 130b, . . . 130N, environmental sensors 140a, 140b, . . . 140N, health sensors 150a, 150b, . . . 150N, and trajectory sensors 160a, 160b, . . . 160N represent some of the categories of sensors 910-910N (as shown in FIG. 9) that can be connected and interfaced to corresponding MC devices 110a, 110b, . . . 110N. The central command computer 190 also can have one or more sensors connected and interfaced to it.

The MC device 110 of FIG. 1 is representative of every MC device connected in the communication system. Each MC device, although a separate device, can perform the same functions and operations, therefore references herein to MC device 110 pertain to any one of the plurality of MC devices 110a, 110b, . . . 110N as depicted in FIG. 2.

Figure 3:
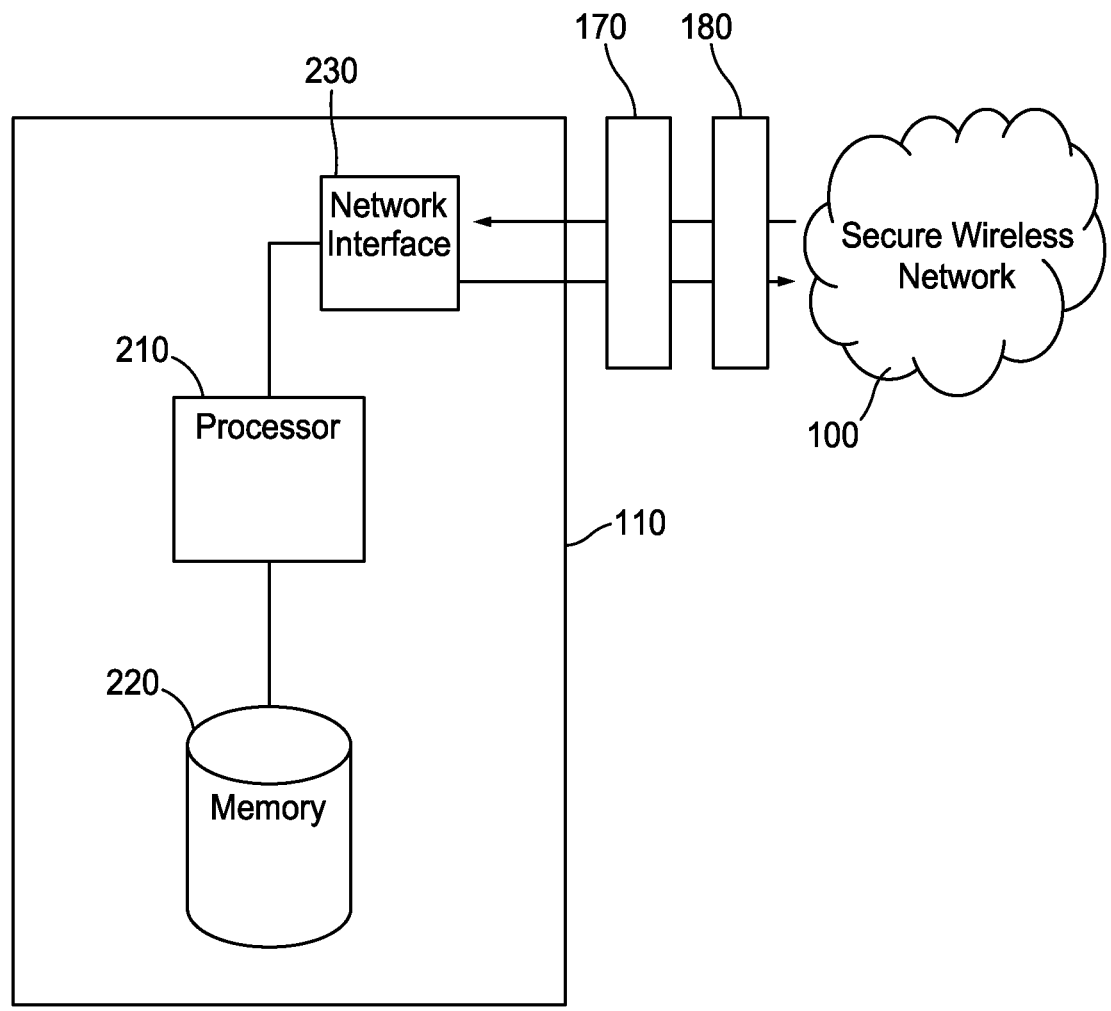
FIG. 3 depicts some of the basic structural and functional components of any computing device collaborating in a communication system according to the invention, whether the device is a mobile computing device or a central command computer.

FIG. 3 depicts some of the basic structural and functional aspects of the MC device 110. Each MC device 110 has at least one processor 210, a network interface 230, and some type of storage device 220 such as computer-readable memory. The storage device 220 contains a software application which, when executed by the processor(s) 210 cause the MC device 110 to function as a fusion engine 120 by, for example, forming the secure wireless network 100, receiving and transmitting sensor output data from sensors, receiving sensor output data from other MC devices 110, receiving commands transmitted from the central command computer 190 or one or more other MC devices 110, providing the received commands to its sensor(s), and automatically receiving and transmitting plug-in components from/to one or more other MC devices in the network. The network interface receives data and commands sent across the secure wireless network and transmits the data and commands to the fusion engine 120.

Each MC device 110 has the at least one processor 210 and one or more computer-readable storage devices 220 for holding software code as well as data, files, etc. The storage devices 220 can include one or more permanent and/or temporary storage devices such as, for example, a hard disk, ROM, flash memory, RAM, and one or more other types of electronic, electro-mechanical, and/or electro-optical computer storage components. The central command computer 190 is a computing device similar in its structure and functionality to each of the MC devices on the network 100. The software code, when executed by the processor(s) of the MC devices and the central command computer, causes each of the MC devices and the central command computer to perform the functions of a fusion engine 120. Each of the MC devices and the central command computer typically will have an operating system such as a Microsoft, Apple, Android, Blackberry, or Linux operating system. The operating systems of the various computing devices on the network can all be the same or can vary from computing device to computing device. A common aspect of each of the various computing devices on the network is that each of them has and executes a fusion engine software application, the functionality or which is described herein.

Secure Wireless Network

In order to connect to other MC devices 110 and to securely exchange data, a user of a MC device 110 must connect online to the secure wireless network 100 through the software of the fusion engine 120. Once logged-on, a MC device 110 may communicate with other MC devices 110 and/or a central command computer 190 that are also connected through the fusion engine 120 software.

Figure 12:
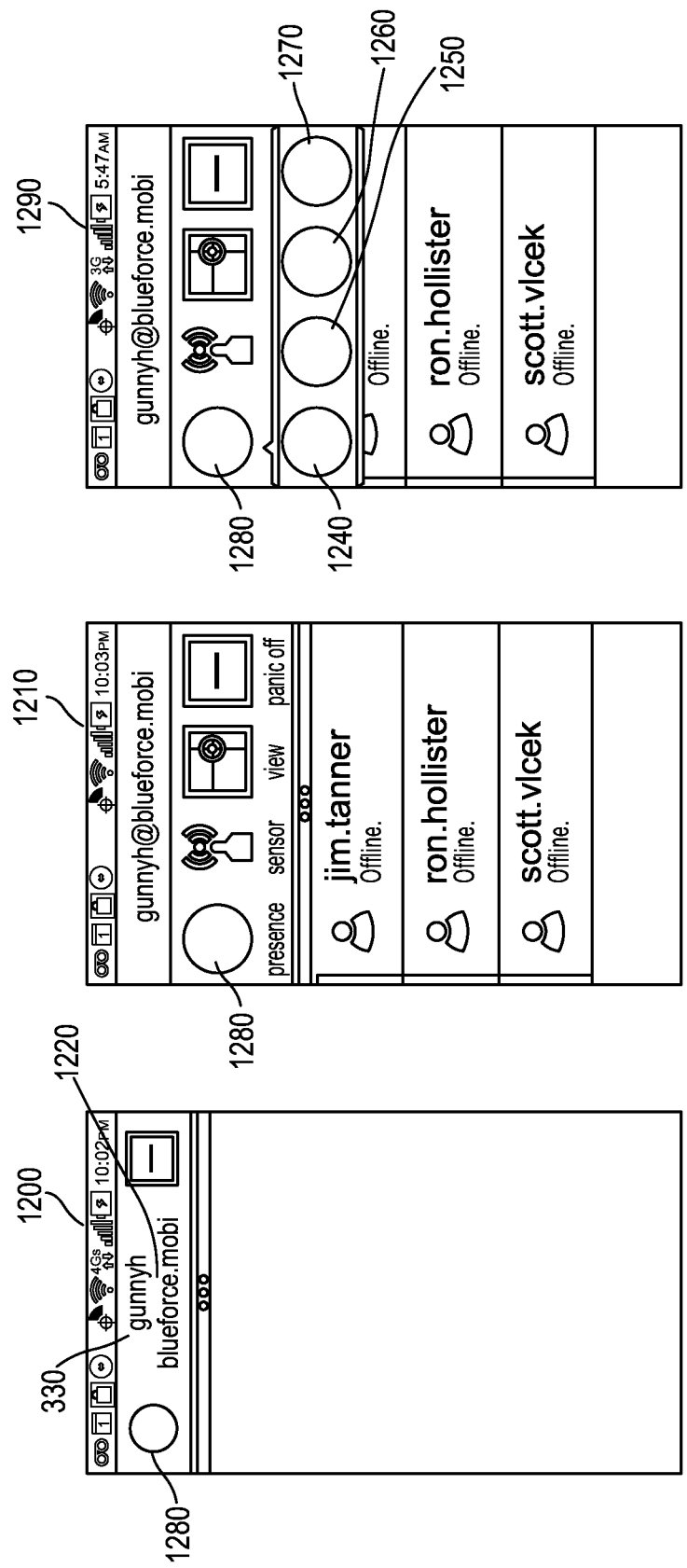
FIG. 12 depicts screen views of how to connect online to the secure wireless network as displayed to a viewer of a mobile computing device.

FIG. 12 depicts how a MC device 110 connects to the secure wireless network. When a user enters the software of the fusion engine 120, the user is brought to a main screen 1200. In order to log onto the secure wireless network, the MC device 110 user clicks the navigation bar 1220. The navigation bar displays the user's contact identification 330, and the user's presence light 1280. The presence light 1280 depicts the user's online status. If the user clicks the navigation bar 1280, an navigation screen 1210 screen appears. If the user clicks the presence light 1280, an online connection screen 1290 appears with a panel of status indicator buttons, including status indicator buttons 1240, 1250, 1260, and 1270. If the user clicks status button 1240, the MC device 110 goes online the secure wireless network and the user's presence light 1220 is changed to indicate an active online presence. If the user clicks status button 1250, the user goes online and the presence light 1280 changes to indicate the user's online presence as "Away" or "Busy." If the user clicks status button 1260, the user goes online and the presence light 1280 changes to indicate a "Do Not Disturb" online presence. In order to disconnect from the secure wireless network, the user presses status button 1270. If the presence light 1280 turns blue, the blue presence indicates to the user and any connected MC devices 110 that the MC device 110 has lost WAN connectivity and has fallen in to LAN mode.

The secure wireless network 100 operates from any connectivity networks available to connected MC devices 110 and the central command computer 190, if any. Therefore, the secure wireless network 100 is an ad-hoc network that is expandable and contractible depending on how many collaborative devices are connected to exchange information. The secure wireless network 100 may encompass central command computer-to-MC device communications and MC device-to-MC device communications. The secure wireless network 100 places security measures, including measures beyond the native Internet Protocol security inherent in any connectivity networks, on communications in order to keep transfers of information confidential and to prevent non-collaborators from accessing any information exchanged. Confidentiality is critical when collaborators are in a military operation or when the operation requires a user to transfer sensitive medical data. The security measures of the secure wireless network allow information sharing among collaborators that is compliant with the Health Insurance Portability and Accountability Act (HIPAA).

Figure 4:
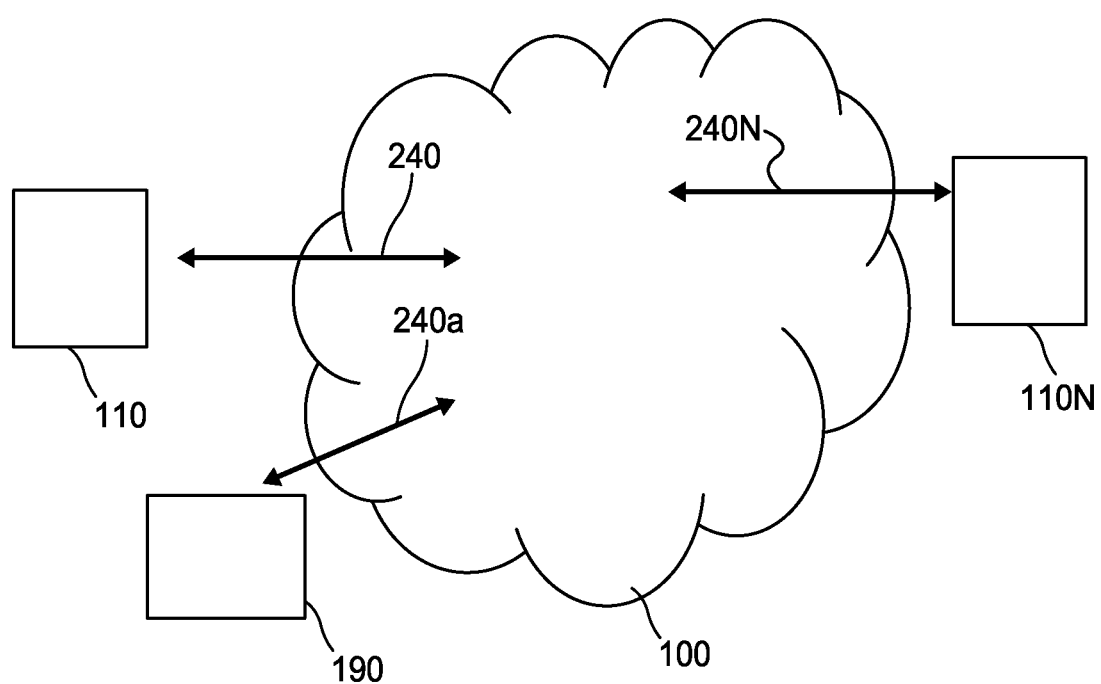
FIG. 4 depicts connectivity networks within the secure wireless network.

As shown in FIG. 4, the secure wireless network 100 forms within any wireless and non-wireless connectivity networks 240-240N available to the central command computer 190 and one or more MC devices 110. The connectivity networks 240-240N include, but are not limited to, any TCP/IP network connection such as ethernet connections, WI-FI connections, radio frequencies such as Bluetooth and Home RF, microwave connections, millimeter wave connections, laser connections such as FSO laser wireless, and satellite connections such as VSAT. The secure wireless network 100 may involve local area networks (LAN) for peer-to-peer communication and wide area network (WAN) for two or more LAN connections. Therefore, a secure wireless network 120 can be formed from one shared connectivity network to multiple remote connectivity networks. For example, the secure wireless network 100 can encompass connectivity network 240 of MC device 110, which can be a WI-FI signal from a wireless beacon on a battlefield, connectivity network 240N of MC device 110N, which can be a satellite network connection in a plane, and connectivity network 240A of a central command computer 190, which can be a ethernet connection at a military base.

Figure 8:
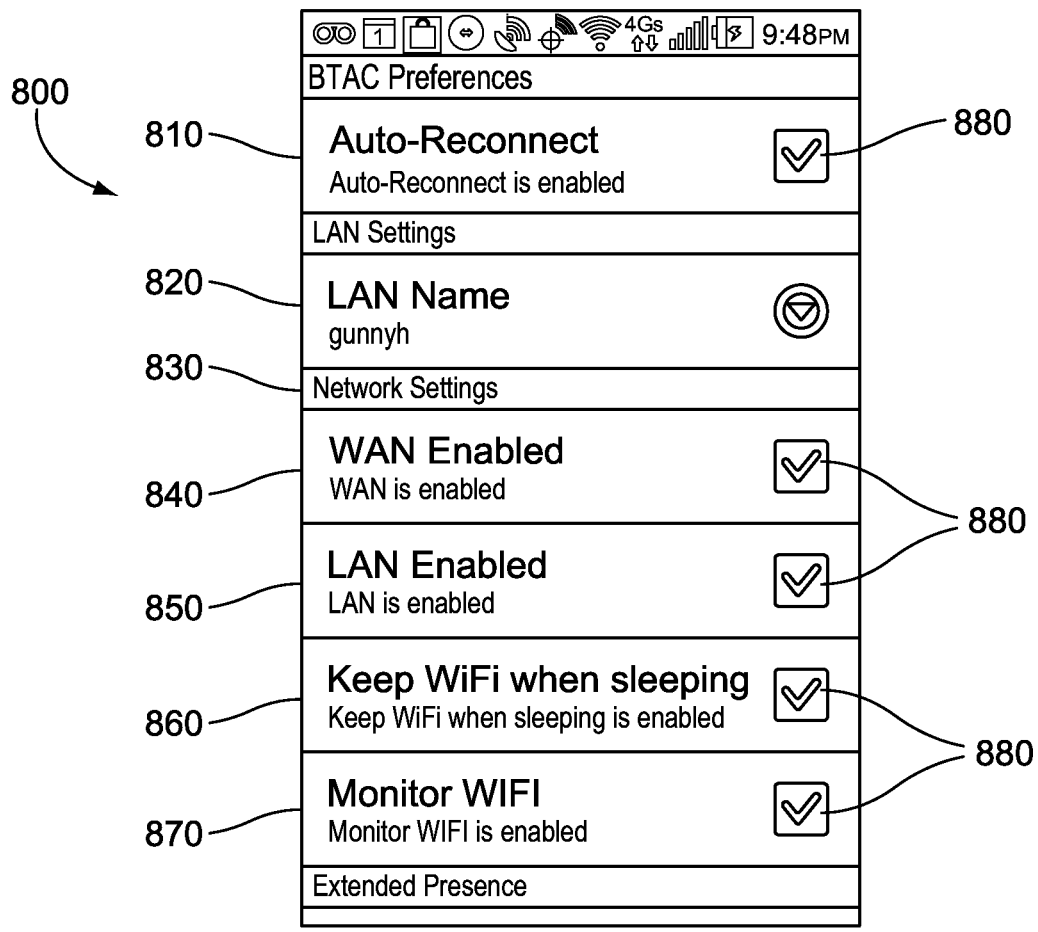
FIG. 8 depicts connectivity network settings in a screen view as displayed to a user of a mobile computing device.

FIG. 8 depicts network connection settings of any one of the plurality of MC devices 110 as displayed to a user. The connectivity display 800 allows a user to set the network connection settings of the fusion engine 120. Auto-Reconnect 810, if on, will attempt to re-establish WAN connectivity if the device gets disconnected from a wireless source. The on/off status of Auto-Reconnect 810 is indicated by a check within in the corresponding on/off flag 880. Auto-Reconnect 810 can be programmed as a default, or can be programmed to have the user set the Auto-Reconnect by clicking the on/off flag. The Auto-Reconnect 810 will attempt to connect to any wireless network available. The LAN Name 820 is an identifier that can be used for zero network conferences that broadcast the MC device 110 on a subnet for peer-to-peer communications.

Network settings 830 show the wireless network setting options. WAN enabled 840 and LAN enabled 850 allow a user to select which modes the MC device 110 will operate under. WAN enabled 840 means that the device will connect to WAN networks if available. LAN enabled 850 means that the device will connect to LAN networks if available. WAN enabled 840 and LAN enabled 850 may be disabled by clicking the corresponding on/off flags 880. "Keep WIFI when sleeping" 860 allows the user to decide whether the device stays connected to a wireless connection if the device goes into sleep mode. Monitor WIFI 870 configures the MC device 110 to continually monitor WIFI connectivity points that are in proximity of the device.

The communication system provides for five levels of security measures in order to secure the device-to-device communications and to form the secure wireless network. The security measures are the same for MC device-to-MC device communications and central command computer-to-MC device communications. Therefore, all of the below security measures as described for MC device-to-MC device communications can apply to central command computer-to-MC device communications. The security measures embodied in the invention include a subscription process 180 and an encryption process 170. The subscription process 180 is further divided into two different security measures, a publish/subscribe architecture and interface access controls. The encryption process 170 is further divided into three security measures: transport layer security, end-to-end encryption, and at rest-data encryption. The communication system may utilize one security measure, two or more security measures in any combination, or all of the security measures.

A. Subscription Process

In order for a team member to connect and communicate with another team member, each of the MC devices 110 that are being used by the team members must engage in the subscription process 180. Each subscription process 180 creates a publish/subscribe architecture for each MC device-to-MC device connection, and each subscription process 180 creates a unilateral exchange of communication. The subscription process 180 requires that any one MC device 110, as a Publisher, must explicitly allow another MC device 110, as a Subscriber, to subscribe to the Publisher's MC device before any communication is transmitted. The Publisher transmits data whereas the Subscriber receives data. In the subscription process 180, the Publisher permits the Subscriber to access its sensor output data and grants command capabilities, and thus opens unilateral communication from the Publisher to the Subscriber. To have bi-directional communication, the subscription process 180 must be reciprocated. When a Publisher and a Subscriber reciprocate the publish/subscribe process, both MC devices 110 in the relationship can transmit data and send commands bi-directionally. If a team member wants to establish communication with multiple MC devices 110, the subscription process 180 must be established independently between each MC device 110.

In order to establish a publish/subscribe relationship, the fusion engine 120 of a Subscriber sends an invite request to a Publisher. Once the invite is accepted, the communications are unilaterally established from the Publisher to the Subscriber, and the connected MC devices are unilaterally subscribed. Publisher MC device 110 cannot receive data or send commands to Subscriber MC device 110 because only unilateral communication was established. For bilateral communication, the Subscriber MC device 110 would send an invite request to the Publisher MC device 110, and the request must be accepted. In other words, the Publisher/Subscriber roles reverse in the reciprocal invite request. After acceptance, the connected MC devices 110 are bi-directionally subscribed. In some aspects, after the initial invite request is accepted, the accepting MC device automatically sends a reciprocal invite to initiate the subscription process 180 with the requesting MC device.

The subscription process 180 is freely revocable. A Publisher may revoke a Subscriber's access, and later allow the revoked Subscriber to re-subscribe. The benefit of the secured wireless network's 100 publish/subscribe architecture is that data is only transmitted to MC devices 110 that need to know the data instead of attempting to secure freely transmitted data from undesirable transmissions.

Figure 5:
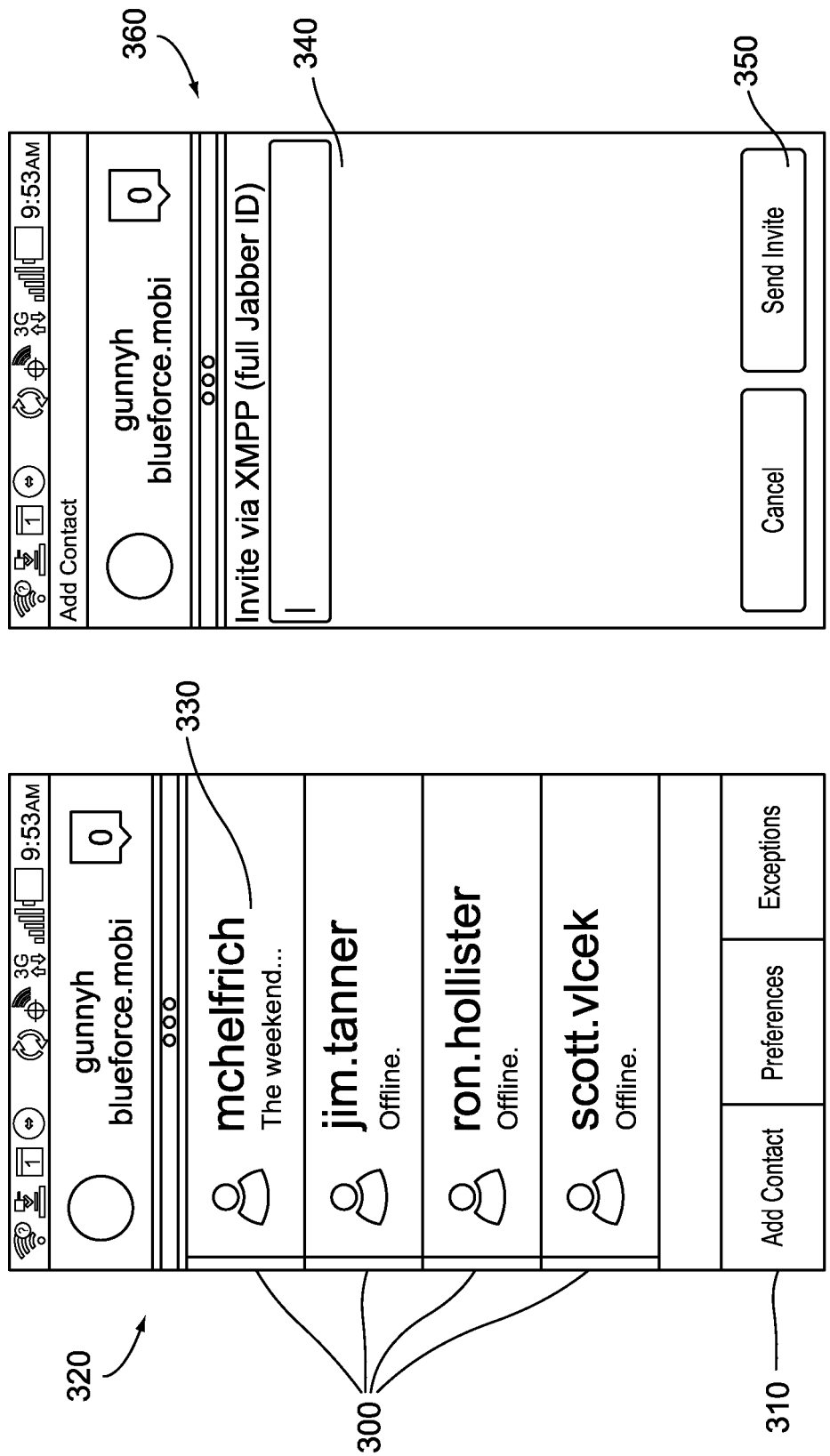
FIG. 5 depicts screen views illustrating the subscription process as displayed to a user of a mobile computing device.

FIG. 5 depicts the subscription process as shown to a user of a smart phone MC device 110. A roster display 120 shows the current subscribed contacts 300 of a MC device 110. The subscribed contacts 300 represent the MC devices 110 that the user is subscribed to. Each MC device 110 in the secure wireless network is assigned a contact identification 330 that allows easy differentiation among MC devices 110. In order to subscribe to another MC device, the user presses a Add Contact 310 button. The fusion engine 120 processes the button function, and an invite screen 360 appears with an invite prompt 340 that allows the user to invite another MC device by its user contact identification 330. The user enters the contact identification 330 of MC device and presses Send Invite 350. The invite request is sent across the secure wireless network to the invited MC device 110. The invited MC device 110 will be prompted to accept or reject the invite. If invited MC device 110 accepts, the invited MC device 110 will be prompted as to whether they would like to reciprocate the invite to the user. If yes, the user will receive an alert that will prompt the user to accept the invited MC device's 110 invitation. If the user accepts, bi-directional communication is established. If the user rejects, only the user may receive data in the relationship because only unilateral communication was established.

The subscription process 180 also provides interface access controls for additional and adjustable security within the publish/subscribe architecture of the secure wireless network 100. The interface access controls allow a Publisher to selectively determine which sensor output data streams any one Subscriber is permitted to view. The interface access controls also let a Publisher decide if a Subscriber may send commands to one or more of its sensors. The Publisher may permit or deny access to one or more of their sensor output data streams to one or more Subscribers. Therefore, the interface access controls can be uniquely set for each Subscriber. One Subscriber may have access to a sensor output data stream 1 without having access to a sensor output data stream 2, and may have the ability to send commands to sensor 1. Whereas, another Subscriber may have access to sensor output data stream 1 and sensor output data stream 2, but the subscriber does not have command capabilities. The benefit of access controls is that a collaborator connected online might not want each team member to view the same data. For example, if sensor output data contains confidential medical information, the collaborator might only want other collaborators that are doctors to receive the sensor output data.

The interface access controls are further designed to allow a Publisher to change or revoke the Subscriber's access to data streams at any point during the connected communications. Because of the adaptable interface access controls, the secure wireless network expands and contracts to include whatever meta-data streams the Publisher allows the Subscriber to view. The interface access controls also expand and contract to include whichever Subscriber MC devices 110 are allowed to send commands and, if allowed, to which sensors.

Figure 6:
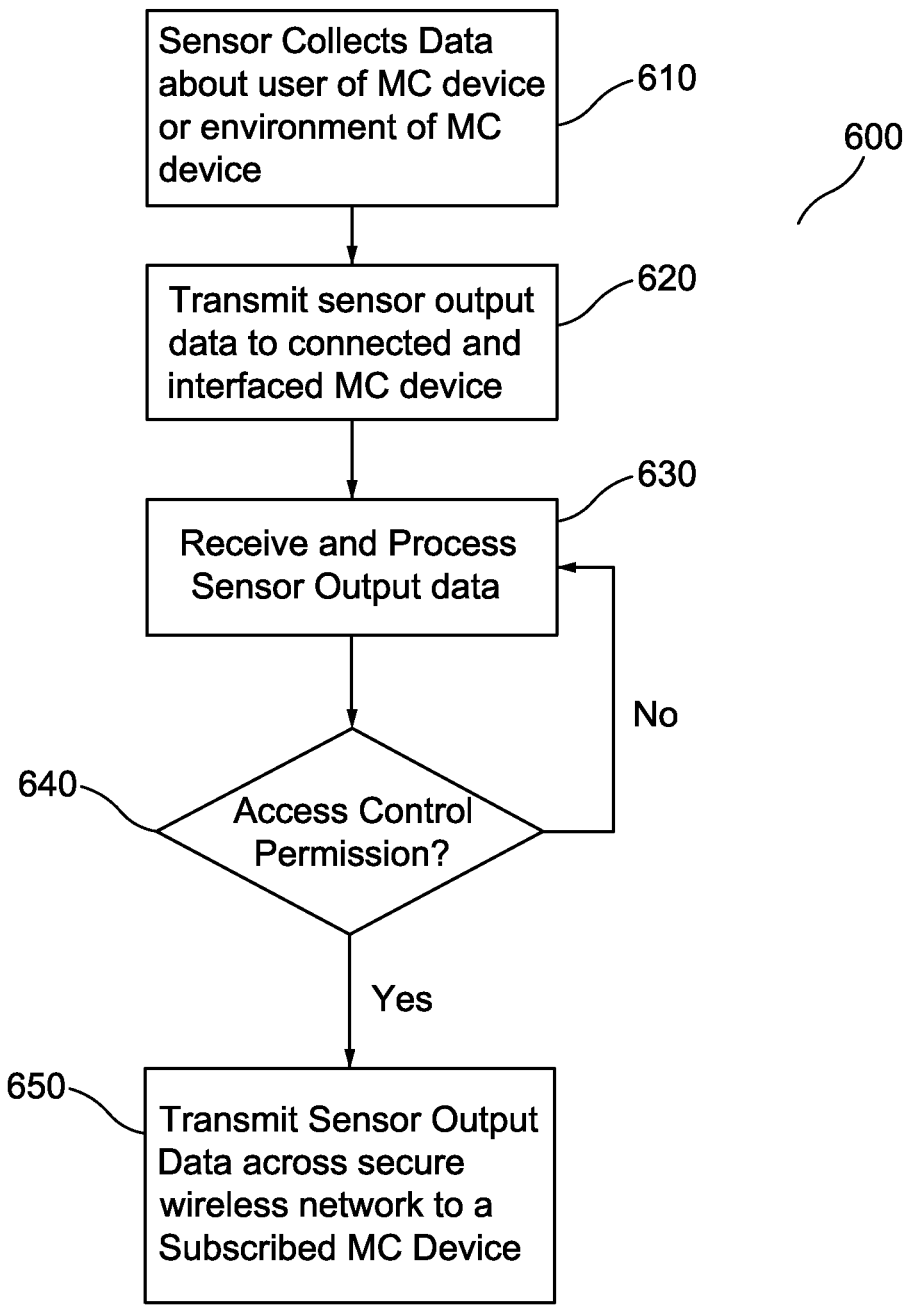
FIG. 6 depicts a flow diagram of sensor output data sent to other mobile computing devices subject to interface access controls.

FIG. 6 depicts the process 600 for sending sensor output data from each sensor connected and interfaced with Publisher to a Subscriber. The process 600 for a Publisher MC device 110 is repeated for each connected and interfaced sensor and for each Subscriber MC device 110. In step 610, a sensor connected and interfaced with a Publisher MC device 110 collects data about the user of the Publisher MC device 110 and/or data about the location, trajectory and/or environmental conditions of the Publisher. In step 620, the sensor transmits sensor output data to the Publisher MC device 110. The Publisher MC device's 110 fusion engine 120 utilizing a plug-in specific to the sensor receives and processes sensor output data from the connected and interfaced sensor at step 630. The interface access controls are exhibited in step 640. If the Publisher MC device's interface access controls are set to grant permission to view the sensor output data to a Subscriber MC device 110, the process 600 moves to step 650 and the data is transmitted across the secure wireless network 100 to the Subscriber MC device 110. If the Publisher MC device 110 does not grant permission, the sensor output data is not sent to the Subscriber MC device 110, and the sensor output data remains on the Publisher MC device 110. The Publisher MC device 110 may change the interface access controls at any time to grant permission to a Subscriber MC device 110 to view a specific sensor's data.

Figure 7:
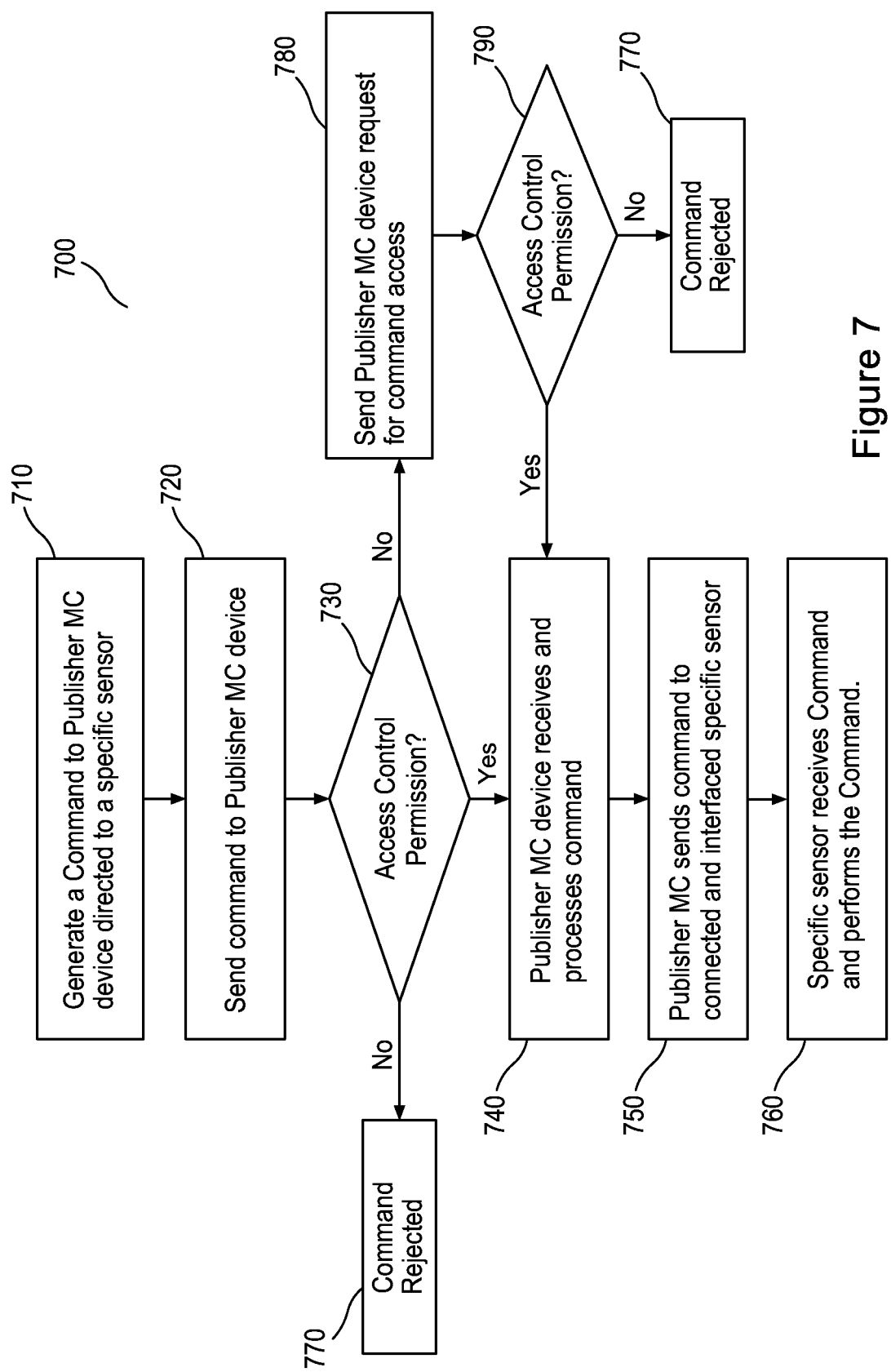
FIG. 7 depicts a flow diagram of commands sent to sensors of other mobile computing devices subject to interface access controls.

FIG. 7 depicts the process 700 for sending commands from a Subscriber MC device 110 to a Publisher MC device 110. The process 700 occurs each time a Subscriber MC device 110 sends a command to a sensor connected and interfaced to a Publisher MC device 110. In step 710, the Subscriber MC device 110 generates a command with its fusion engine 120 directed to a specific sensor connected and interfaced to a Publisher MC device 110. In step 720, the Subscriber MC device 110 sends the command across the secure wireless network. Before the Publisher MC device 110 receives the command, the command is subject to the Publisher MC device's 110 interface access controls in step 730. If the Publisher MC device's 110 interface access control setting allows the Subscriber MC device 110 to send commands to the specific sensor, then the process 700 moves to step 740. In step 740, the Publisher MC device's 110 fusion engine 120, utilizing a plug-in specific to the sensor, receives and processes the command. Next in step 750, the Publisher MC device 110 sends the command to the specific sensor. In step 760, the specific sensor receives the command and performs the function of the command. If, in step 730, the Publisher MC device 110 does not grant command capabilities to the Subscriber MC device 110 for the specific sensor, either the command is rejected 770 or a command capabilities request 780 is sent. In step 770, the command is rejected. In step 780, the rejected command prompts the Subscriber MC device 110 to send a command access request to the Publisher MC device 110. If the Publisher MC device 110 accepts the command request, the Publisher MC device's 110 interface access controls are automatically updated to allow reception of commands sent from the Subscriber MC device 110 to the specific sensor. After the request is accepted, the command goes through steps 740, 750, 760. However, if the Publisher MC device 110 rejects the request for command capabilities, the command is rejected as in step 770.

Figure 11:
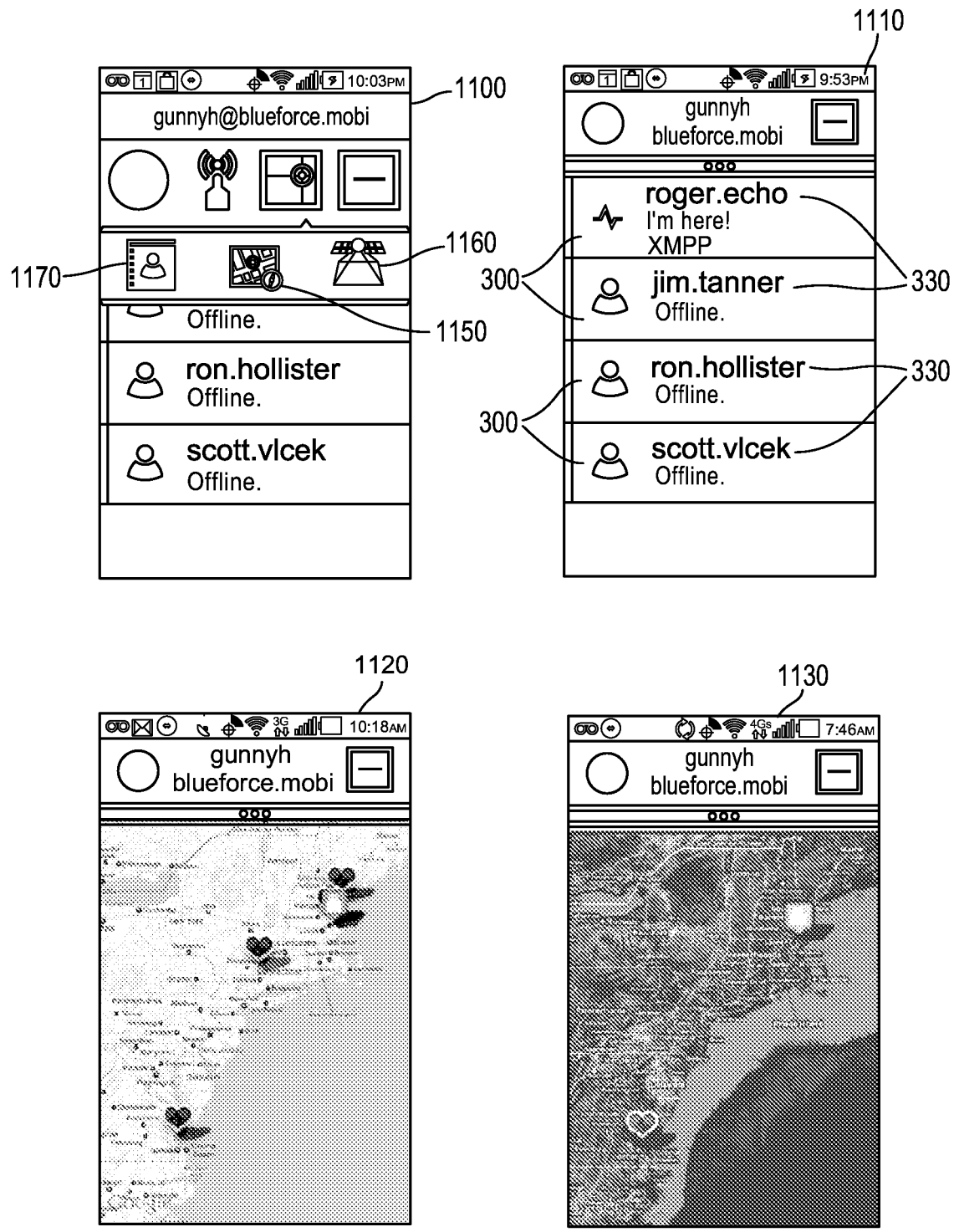
FIG. 11 depicts location screen views as displayed to a user of a mobile computing device.

After the subscription process 180, any subscribed contacts are shown on the roster display on an MC device. FIG. 11 shows a roster screen view 1110. The roster screen view shows the subscribed contacts 300 by their contact identifications 330.

B. Encryption Process

In addition to subscription process 180, the secure wireless network 100 includes an encryption process 170 that places encryption measures on all data exchanged among subscribed MC devices 110. One aspect of the encryption process 170 is transport layer security (TLS). TLS is a cryptographic protocol that prevents a third party from intercepting, eavesdropping, or tampering with communications sent to subscribed MC devices 110 within the secure wireless network 100. TLS of the communication system encrypts segments of the communication data stream using asymmetric cryptography for key exchange, symmetric encryption for privacy, and message authentication codes for message integrity.

The asymmetric cryptography uses a pair of keys, or algorithms, to encrypt and decrypt data sent between any two subscribed MC devices 110. Any one subscribed MC devices 110 within the secure wireless network is given a public and private key pair. When a Publisher MC device 110 wants to send encrypted data to a Subscriber MC device 110, the Publisher MC device 110 encrypts the data using the Subscriber's public key. The encrypted data is then sent over the network to the to the Subscriber MC device 110. In order to decrypt the data, the Subscriber MC device 110 must use its private key. Because the key pairs are unique to every Subscriber, only the Subscriber's private key can decrypt messages that were encrypted with their public key. The secure wireless network 100 uses the asymmetric cryptography to securely exchange a unique key between any two subscribed MC devices 110 for symmetric encryption. To ensure the exchange is not tampered, the message is sent with an authentication code. Once subscribed MC devices 110 are securely given a unique key, the connected MC devices 110 can securely communicate using symmetric encryption, such as in the end-to-end encryption, in which messages are sent back and forth are encrypted and decrypted using the unique key.

Each time a subscribed MC device comes online, the above TLS protocol is established. If one MC device 110 is subscribed to two or more MC devices 110, an individual TLS protocol is enforced between each MC device-to-MC device connection.

The encryption process 170 also provides for end-to-end encryption after the initial TLS protocol among subscribed MC devices 110. The end-to-end encryption further encrypts data communicated among MC devices, including sensor output data and commands. In certain aspects, the fusion engine 120 generates a unique key for symmetric encryption among connected MC devices, and distributes the key after the asymmetric encryption and the authentication of the TLS protocol have been successfully established. Any symmetric key can be used to encrypt data communicated among devices, such as a triple data encryption algorithm (3DES), International Data Encryption Algorithm (IDEA), CAST5, BLOWFISH, and TWOFISH. The symmetric key is uniquely generated for the current online session among subscribed MC devices 110. Only subscribed users that possess the symmetric key may view data communications. Every time one of the subscribed MC devices 110 goes offline or comes back online, the MC devices 110 are assigned another unique session based key. As a result, the secure wireless network effectuates an unique session-based encryption between any two subscribers.

In one aspect, the end-to-end encryption provides for asymmetric encryption to encrypt data communicated among MC devices after the initial TLS protocol. This provides for extremely confidential transmission of data across the secure wireless network. For asymmetric encryption, any asymmetric algorithm, which utilizes a private key and a public key, can be used to encrypt data transferred among devices, such as RSA, DSA, and ELGAMAL.

In addition, the encryption process also provides for encryption of at-rest data, such as files, saved emails, contact information, and saved sensor data, stored on any one of the MC devices 110. Data stored on any MC device 110 can be encrypted with a 256-bit advanced encryption schema (AES) key, or any other secure algorithm key, that is derived from a device password and other device specific meta-data. The software application can encrypt all data stored on the device or only encrypt targeted data with the AES key. For example, the software code of the fusion engine 120 may only target encrypt contact information of subscribed users and stored sensor output. In one aspect, the AES key is one certified by the National Security Agency. At-rest data encryption stores the files while they are not in use of the MC device 110. When a user of the MC device wants to transmit the stored files and saved emails, the data is then subject to the end-to-end encryption.

The software code of the fusion engine 120 may have an unlock feature on the MC device 110. The unlock feature that requires a user to enter a password in order for the MC device 110 to access the secure network. This unlock action provides the MC device with the keys described above that are required to access and exchange data and send commands.

The formalities of a Subscriber and Publisher are only used to discuss the subscription process 180, encryption process 170, and formation of the secure wireless network 100. Therefore, communicating MC devices 110 connected to the secure wireless network 100 are subscribed MC devices 110, and are described hereafter, without the formal Subscriber and Publisher designations.

Communication of Data

In this section, MC devices 110 discussed are connected to the secure wireless network, subscribed to each other, and have access control permission.

In order to provide superior decision support, beyond verbal communication, emailing, and transferring of files, the communication system provides for the transfer of sensor output data collected from sensors, including external and internal sensors, that are connected and interfaced to a MC device 110. When transmitted across the network, the sensor output data provides an additional layer of communication among connected collaborators, and provides information about health of the user of the MC device 110 and/or the location, environmental conditions, and trajectory of the MC device. The amount and type of data communicated expands and contracts depending on the quantity and type of sensors that are connected to each MC device 110 within the network. Every MC device's 110 is capable of connecting to any number of external and/or internal sensors to expand or contract the amount and type of sensor output data the user of the MC device 110 wants to transmit.

Figure 10:
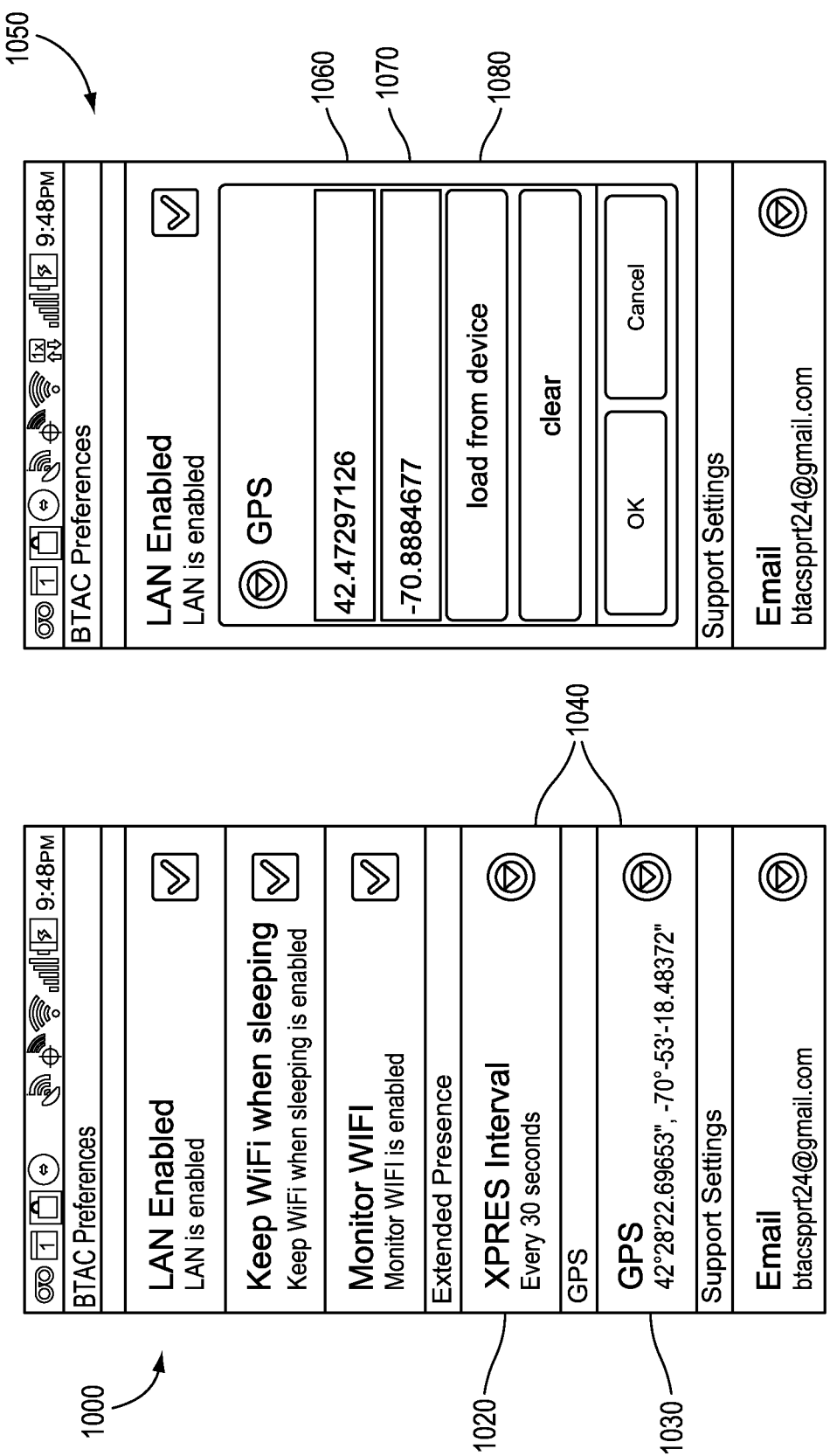
FIG. 10 depicts GPS setting screen views as displayed to a user of a mobile computing device.

The fusion engine 120 can be set to transmit to sensor output data continuously or periodically without manual entry required from a user of the MC device at the time of the data exchange. In one aspect, the software of the fusion engine 120 sets the timing of sensor output data transmission from the sensors to the connected and interfaced MC device 110. In another aspect, the software of the fusion engine 120 allows for the user to set when sensor output data is sent across the secure wireless network to connected MC devices 110. In FIG. 10, a user may set automatic transmission of sensor output data to a MC device 110 using the XPRES Interval setting 120. The user enters the XPRES Interval setting 120 by clicking the corresponding button 1040. XPRES Interval setting 120 allows the user to set time increments at which the user's sensor output data will be transmitted to connected MC devices 110. The interval may be set to transmit data every second for real-time information updates, or the interval may be set to transmit data every hour. In some aspects, the program may allow the user to set-up a customized XPRES Interval 120 for each sensor connected to the user's MC device 110 and for each connected MC device.

A. Sensors and Sensor-to-MC Device Connections

FIG. 9 shows external sensors 910-910N connected and interfaced with a MC device 110 and internal sensors 940-940N inbuilt to a MC device 110. FIG. 9 is representative of the external sensor connections and internal sensor connections of any one MC device 110 of the plurality of MC devices 110a, 110b, . . . 110N of the communication system. External sensors 910-910N and internal sensors 940-940N represent a plurality of sensors of the sensor categories depicted in FIGS. 1 and 2. The plurality of sensors can include location sensors 130-130N, environmental sensors 140-140N, health sensors 150-150N, and trajectory sensors 160-160N.

External sensors 910-910N include any external sensor that is equipped with an input/output port and an application-programming interface that is compatible with the fusion engine 120 and plug-ins 960-960N downloaded on the MC device 110. External sensor output data 930-930N can be transferred from a sensor 910-910N to a connected and interfaced MC device 110 by any mode of electrical transmission. In certain aspects, external sensors 930-930N may be equipped to electronically transfer sensor output data 930-930N via any wireless, radio frequency, or hardwire interfaces such as but not limited to Bluetooth, TCP/IP V4 or V6, Recommended Standard 232 (RS-232), radio-frequency identification (RFID), ZigBee, and a hard wire serial connection to a MC device 110. The MC device 110 securely receives external sensor output data 930-930N by using its native operating system's encryption and authorization process.

Internal sensors 940-940N are sensors built into the MC device 110, such as a GPS device, accelerometer, and oscilloscope. The fusion engine 120 collects the internal sensor output data from the MC device itself.

Health sensors 150-150N collect data representative of a physiological aspect of a user of a MC device 110. Health sensors can be external sensors 910-910N or internal sensors 910-910N. Health sensors 150-150N can include a heart rate monitor, a respiration monitor, a body temperature monitor, a pulse oximeter, and a 3-lead electrocardiography. For example, a heart rate monitor with Bluetooth capabilities can be located on the wrist of a person using a MC device. The heart rate monitor collects the person's heart rate and outputs the heart rate data to the person's MC device.

Environmental sensors 140-140N can be non-bio-telemetry sensors that collect data about the environmental conditions surrounding the MC device 110 and the user of the MC device 110. Environmental sensors 140-140N may include internal sensors 940-940N and external sensors 910-910N. These non-bio-telemetry sensors include powered air purifying respirators, self-contained breathing apparatus, unmanned aerial vehicles, chemical detectors, biological detector, explosive detectors, magnetometers, passive infrared detectors, seismic monitors, video recorders, cameras, electro-optical imager, and thermal imagers. For example, a firefighter uses an MC device 110 connected to chemical detector located on his jacket. The chemical detector detects and measures the air quality of the environment surrounding the detector, such as smoke or other toxins found in the air. The chemical detector will transfer the detected air quality data to the firefighter's MC device 110.

Location sensors 130-130N provide information about the location of the MC device 110, and thus the user of the MC device 110. Location sensors 130-130N may include internal sensors 940-940N and external sensors 910-910N. The location sensor output data includes the location, movement, and proximity to a wireless access point device or wireless beacon. For example, a location sensor can be a global positioning system (GPS) that tracks and record geospatial data such as the latitude, longitude and altitude.

FIG. 10 shows a GPS setting screen views as displayed to a user of a MC device 110. The user can adjust the GPS setting if the device is using an internal GPS sensor. Screen view 1000 shows the current GPS setting 1030, and represents the latitude and longitude of the MC device 110. An open button 1040 allows the user to adjust the corresponding setting. When the open button 1040 that corresponds with the GPS setting 1030 is pressed, the screen view 1050 will appear. Latitude 1060 and longitude 1070 coordinates may be continually loaded from a GPS sensor, entered manually, or static loaded from a GPS sensor. If left blank, the fusion engine 120 will pull the GPS coordinates continuously or at specific time intervals based on the time setting of XPRES Interval 1020. If the device does not have a GPS or the GPS is not functioning, the latitude 1060 or longitude 1070 may be entered manually. If the user does not want the GPS data taken continually, the user may press "load from device" 1080. "Load from device" 1080 causes the fusion engine 120 to take a static reading from the GPS at that moment. The static reading will be the set location of the MC device's 110 and until the user manually changes the latitude 1060 and longitude 1070 or again presses load from device 1080.

FIG. 11 shows the location of a user of an MC device 110 and the location of any connected MC devices 110 as displayed to a user. The MC device 110 shows its location and the location of any connected contacts 300 in a map view 1120 and/or in a satellite view 1130. In order to display the satellite view 1130, the user presses satellite button 1160 on the contact view screen 1100. In order to display the map view 1120, the user presses map button 1150 on the contact screen 1100. The map view 1120 and the satellite view 1130 can have zoom in and zoom out features. Each connected MC device 110 is represented as a heart on either view. Instead of viewing connected MC devices 110-110N by location, the user may click roster view button 1170 in order to view connected users 300 by their contact identifications 330 in the roster view 1110.

The sensor output data may also represent a MC device's 110 location with respect to a wireless signal producer. If a MC device 110 runs on WIFI, the fusion engine 120 will interpret wireless identifying meta-data gathered from a wireless signal that the MC device 110 is connected to in order to determine the MC device's 110 location. The wireless identifying meta-data includes a set identifier and the wireless decibel strength from one or more wireless access point device or from a device that produces a wireless beacon. The fusion engine 120 processes the collected wireless identifying meta-data and formats the wireless identifying meta-data to display the user's distance to the each wireless signal producer on a screen of a MC device 110 and any connected MC devices 110. This allows connected MC devices 110 to have some acuity as to where another MC device 110 might be inside of a structure or other landscapes in which GPS coordinates are similar but collaborators still need to know where each team member is with proximity.

For example, in a hostage situation occurring in a 10 story building, the team members may have set-up a wireless beacon device A on the top story of the building and a wireless beacon device B on the ground floor of the building to ensure wireless connectivity of their MC devices. A central command computer is monitoring each team member's location via its proximity to the wireless beacon. The fusion engine of team member 1 will identify each wireless beacon by its set identifier and display its corresponding signal strengths to the subscribed central command computer. If a team member 1 is on the bottom floor, its MC device will display high signal strength from wireless beacon device 2, and low signal strength from wireless beacon device 1. Based on the set identifier and signal strengths, the central command computer will know with proximity that team member 1 is near the bottom floor of the structure.

Trajectory sensors 160-160N detect the path and motion of an MC device. Examples of trajectory sensors include an accelerometer and a gyroscope. Trajectory sensors 160-160N may include internal sensors 940-940N and external sensors 910-910N. The accelerometer detects motion and the gyroscope detects orientation, or rotation. The accelerometer sensor output data and gyroscope sensor output data can be displayed to a user of the MC device and any subscribed MC devices. In certain aspects, the software of the fusion engine 120 processes the accelerometer sensor output data and gyroscope sensor output data together to produce the trajectory of the MC device 110. The trajectory data can represents the real-time path and motion of the MC device by continuously combining and streaming the MC device's current orientation, position, and velocity.

In order to receive external sensor output data, the MC device 110 connected to a sensor must download a plug-in 960-960N that corresponds to a sensor 910-910N. The sensor specific plug-in 960-960N provides instruction to the fusion engine 120 regarding the reception and transmission of sensor output data. Each sensor specific plug-in 960-960N manages the connectivity between the MC device 110 and external sensors 910-910N and ensures the communication channel between the sensor 910-910N and MC device 110 is correctly functioning. Specifically, the sensor specific plug-in 960-960N is equipped with connectivity logic to manage the electronic transmission of sensor output data 930-930N from sensors 910-910N equipped with any wireless, radio frequency, or hard wire interface. Once the communication channel is open between the sensor 910-910N and the MC device 110, the sensor specific plug-in 960-960N processes the sensor output data 930-930N using business logic. A plug-in 960-960N may also correspond to an internal sensor 940-940N. For example, the business logic of a plug-in specific to an internal sensor may optimize the fusion engine's utilization of internal sensors 940-940N. The plug-in's 960-960N business logic processes the electronically transmitted sensor output data into computer-readable data packets. The data packets may be transmitted to subscriber MC devices 110, the central command computer 190, or both.

FIG. 9 depicts the transmission of internal and external sensor output data to a connected and interfaced MC device 110. An external sensor 910-910N sends external sensor output data 930-930N to the fusion engine 120. The fusion engine 120 contains plug-ins 960-960N that correspond to external sensors 910-910N. The external sensors 910-910N collect and transmit external sensor output data 930-930N to the MC device 110. The transmitted external sensor output data is received and recognized by the plug-in's 960-960N connectivity logic. The plug-in's 960-960N business logic converts the external sensor output data 930-930N in to computer readable data packets 930*-930N* (as denoted by an asterisk (*)) for transfer over the secure wireless network. Internal sensors 940-940N collect data about the MC device 110, and transmit the internal sensor data 950-950N to the fusion engine 120. The software of the fusion engine 120 or the business logic of a downloaded sensor specific plug-in 960-960N may process the internal sensor output data 950-950N into computer readable data packets 950-950N*. The software of the fusion engine's 120 can be equipped to process and transmit of data from internal GPS, gyroscopes, and accelerometers alone, however some plug-ins may provide enhanced processing of such data.

B. Transmission of Sensor Output Data

After sensor output data is received and processed into data packets by a connected and interfaced MC device, the MC device can communicate the sensor output data to any subscribed MC devices and central command computers. The communication of sensor output data provides situational awareness because each team member will know the sensor readings specific to each team member's person and locale.

FIG. 9 shows the transfer of sensor data, in the form of data packets, in an MC device-to-MC device connection. The MC device-to-MC device communication depicted in FIG. 9 is representative of communications between any two of the plurality of MC devices, and also applies to MC device-to-central command computer connections. As shown in FIG. 9, the asterisk (*) as applied to a computing device indicates that MC device 110* is receiving internal sensor output data packets 950*-950N* and external sensor output data packets 930*-930N* from an sender MC device 110, which is connected and interfaced with the sensors.

In FIG. 9, once the internal sensor output data 950-950N and external sensor output data 930-930N are processed into data packets, the fusion engine 120 subjects the external sensor output data packets 930*-930N* and internal sensor output data packets 950*-950N* to the encryption process 170. After the encryption process 170, the internal sensor output data packets 950N*-950N* and external sensor output data packets 930*-930N* of MC device 110 are transmitted in encrypted format to receiver MC device 110*.

In order to view any sensor output data, the sensor specific plug-in 960-960N has a viewer component that converts the computer readable data packets into a human-readable medium for display. Because the viewer component is a part of the downloaded plug-in 960-960N, users that have downloaded a plug-in 960-960N for a particular sensor will also have the viewer component for that sensor. When the connected and interfaced MC device 110 or central command computer 190 has the viewer component for a particular sensor, the fusion engine 120 will immediately upload the sensor output data onto the display of the MC device 110 or onto the display of the central command computer 190. For example, MC Device 1 connected and interfaced to Sensor A has Plug-in A installed. Plug-in A collects and processes Sensor A's output data into data packets. The Viewer Component A converts the data into human readable form and displays the Sensor A output data on the connected MC device 1.

The sensor output data packets 930*-930N* and 950*-950N* also contains viewer identifying meta-data so that receiver MC devices 110* and central command computers 190* may locate the appropriate viewer corresponding to the sensor after receipt of the data packet. The viewer identifying meta-data includes: 1) Sensor Name; 2) Plug-in Version Number; and 3) Global Unique ID. Upon receipt of a MC device's sensor data packet, a receiver MC devices 110* or central command computer 190* will look into its memory for a viewer component that matches the identifying meta-data. If the receiver MC device 110* or central command computer 190* has the correct viewer, the fusion engine 120 will select the viewer for data packet processing, and the viewer will immediately display the sender MC device's 110 sensor output data.

Figure 14:
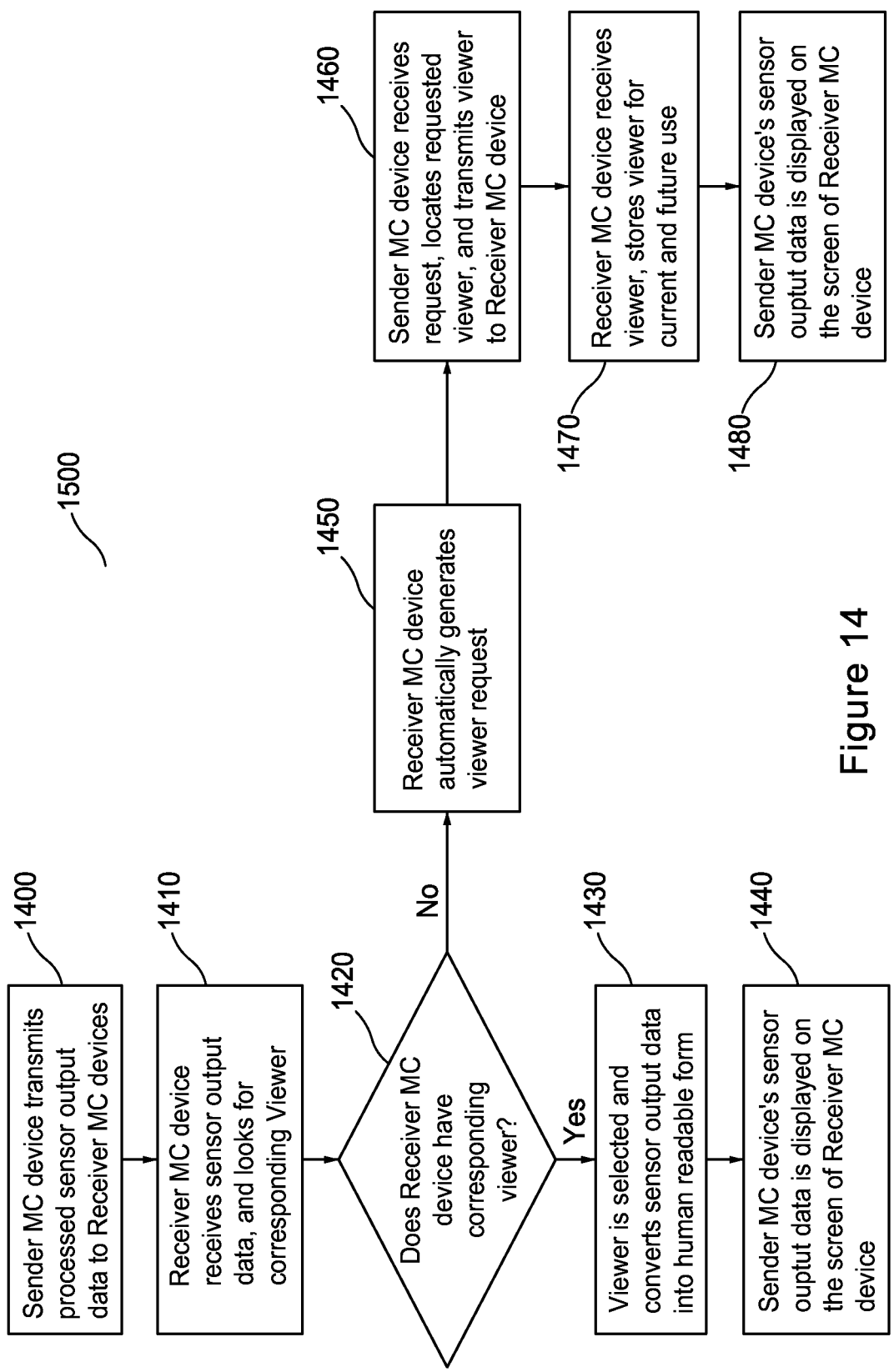
FIG. 14 depicts an automatic distribution of plug-in viewer components from one mobile computing device to another mobile computing device.

If the receiver MC device 110* receives sensor output data but does not have the correct viewer within the fusion engine 120, the software provides for an auto-distribution of a correct viewer. The auto-distribution of viewers allows a MC device 110* to receive sensor output data over the secure wireless network from any sender MC device 110 without having to pre-download the plug-in that corresponds to the sensor. FIG. 14 is a flow chart depicting the auto-distribution of viewers process 1500. In step 1400, a sender MC device 110 transmits sensor output data packets to a receiver MC device 110*. In step 1410, once the MC device 110* receives the sensor output data packets, the fusion engine 120 of the receiver MC device 110* looks through its memory to find a viewer that matches the viewer identifying meta-data. If the receiver MC device 110* has a matching viewer, the MC device 110* will proceed to step 1430. In step 1430, the matching viewer is selected, and the viewer will convert the received sensor output data packets into human readable form. In step 1440, the viewer displays the sender MC device's 110 sensor output data on the screen of the receiver MC device 110*.

If the matching viewer is not found, the process 1500 moves to step 1450. The receiver MC device 110* will automatically transmit a request across the secure wireless network to the sender MC device 110 for the correct viewer. Upon receipt of the request in step 1460, the sender MC device 110 locates the requested viewer and transmits the viewer over the secure wireless network to the receiver MC device 110*. In step 1470, the receiver MC device 110* receives and registers the correct viewer into its memory for current use and future use. The receiver MC device 110* then uses the correct viewer to convert the received sensor output data packets into human readable form. In step 1480, the sender MC device's 110 sensor output data is displayed on a screen for a user of the receiver MC device 110*.

The auto-distribution of viewers process 1500 also applies when the sender of processed sensor output data is a central command computer 190 or the receiver of sensor output data is a central command computer 190*.

The plug-ins 960-960N of MC devices 110 and central command computers 190 may be pre-programmed or programmed with interface access controls to control the transmission rate of the sensor output data to receiver MC devices 110*. The plug-in may be programmed to continuously stream sensor output data for real time data transmissions, periodically stream sensor output data at certain time intervals, or configure the sensor output data stream to correspond with the secure wireless network's bandwidth. In one embodiment, the device uses XPRES Interval 1020, as shown in FIG. 10, to set the rate of sensor output data transmission.

The communication system also provides status bits to the user of an MC device 110 that characterize the operating status of each sensor 910-910N and 940-940N connected and interfaced to a MC device 110. The status bits alert the user MC device 110 and any receiver MC devices 110* as to how the sensors are currently operating in connection with the user MC device's corresponding plug-in. In order to view status bits, the user can click on a subscribed contact's icon in order to view the contact's sensor and sensor output data. The status bits are located next to each sensor listed under the subscribed contact's icon, and can be displayed or conveyed to a user of an MC device 110 either as a description or as an icon. The subscribed contact's icon represents on a screen display the subscribed MC devices a user is connected with. In certain aspects, the status bits of any one sensor can include but are not limited to: 1) Status Bit 0: Plug-in is downloaded and on the MC device, but the sensor is not turned on or connected; 2) Status Bit 1: Plug-in is activated, communicating with its corresponding sensor, and sharing data with connected MC devices; 3) Status Bit 2: Plug-in is activated, but the plug-in is not properly communicating with corresponding sensor or the sensor is not properly functioning; and 4) Status Bit 4: Plug-in is activated, communicating with corresponding sensor, and the received sensor output data is outside of acceptable business logic. The identifying numbers of the status bits, i.e. 0, 1, 2, and 4, are designated to differentiate status bits that have different functions, and any other number or identifier can be used.

The status bits are beneficial because the status bits provide an additional layer of communication beyond the transmission of sensor output data. The status bits provide information as to why the MC device is or is not receiving sensor output data, whether the sensor output data is reliable, and whether the received data should cause alarm.

Status Bit 0 informs a MC device 110 and any subscribed MC devices 110\* as to which plug-ins are currently enabled on MC device 110. In practice, the subscribed MC device 110\*, upon noticing a sensor is not enabled on the MC device 110, may send a command to turn the sensor on and/or send a message to the user of MC device 110 that he needs the sensor enabled to obtain information vital to the collaboration's goal.

Status Bit 1 indicates that a sensor connected and interfaced with the MC device 110 is properly performing sensor functions and accurately communicating the sensor output data to the MC device 110 without interference. When sensor output data is accompanied with Status Bit 1, the operators of subscribed MC devices 110\* may rely on the sensor output data for decisional support.

Status Bit 2 allows the MC device 110 to troubleshoot any sensor/device communication disconnects and indicates to subscribed MC devices 110\* that the sensor may be sending inaccurate data. For example, if a radiological pager sensor is picking up background noise, data transmitted from the radiological pager sensor will be accompanied with Status Bit 2 to inform the MC device 110 and any subscribed MC devices 110\* that the radiological sensor output data may not be accurate. In practice, the MC device 110 user may try to fix the radiological pager, and the Status Bit 2 puts operators of subscribed MC devices 110\* on notice not to rely on data sent from the radiological pager.

Status Bit 4 triggers an alert because the plug-in and sensor are correctly working, but the received sensor output data is not normal. Acceptable business logic sets the parameters for "normal" sensor output data. The parameters may be defined by the plug-in or established by the user, and can be set to indicate an emergency. For example, a person has a normal blood oxygen saturation level that ranges from 90 to 100. When a person's blood oxygen falls below 90, the person experiences Hypoxemia, which is accompanied with shortness of breath and dizziness and can affect one's ability to function. A plug-in for a Pulse Oximeter may have its business logic set to send a Status Bit 4 alert when the Pulse Oximeter sends data that the user's blood oxygen saturation level is below 90 or above 100. The user of the MC device 110 receiving the alert can adjust his behaviors to regain normal blood oxygen or begin to actively seek help. If the user is incapacitated by the Hypoxemia, the user is not without aid because the Status Bit 4 also alerted the emergency condition to any subscribed contacts. The operators of subscribed MC devices 110\* after seeing Status Bit 4 displayed with the user's Pulse Oximeter sensor data on their computing device know there is something seriously wrong with the user of MC device 110, and can act accordingly.

Figure 13:
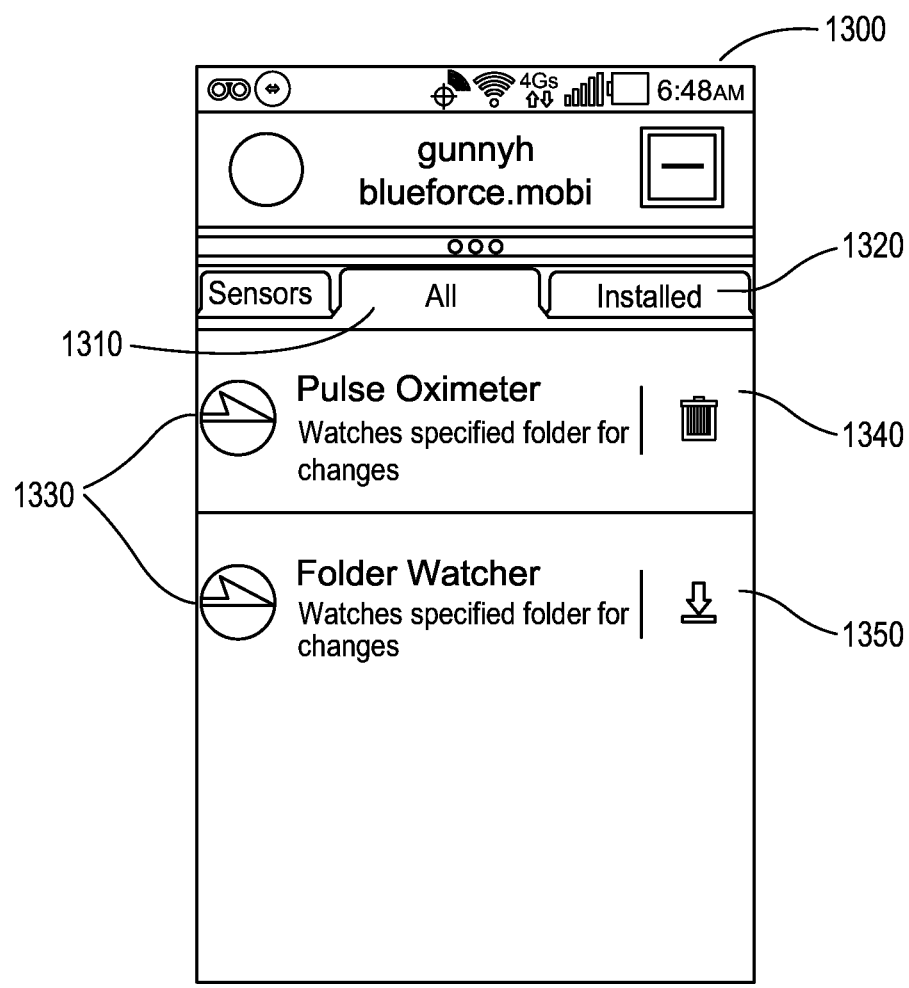
FIG. 13 depicts a sensor screen view as displayed to a user of a mobile computing device.

FIG. 13 depicts a sensor screen view that allows users of an MC device 110 to view what sensor plug-ins have been downloaded on the MC device. If the All tab 1310 is clicked, the user of the MC device 110 can see all sensor plug-ins 1330 that have been installed or can be installed. The trash can button 1340 shows to the user that the plug-in is installed. The plug-in may be un-installed by clicking the trash can button 1340. The downward arrow 1350 indicates that the sensor plug-in 1330 is not installed, and may be installed by clicking the downward arrow 1360. If the user clicks the installed tab 1320, a listing of only downloaded plug-ins will appear.

C. Transmission of Commands

The invention also provides for an MC device 110 to receive a command from a central command computer and/or from another MC device. Commands in the communication system are used to direct the function of another MC device's sensors. As shown in FIG. 9, the commanding MC device 110\*, as denoted by an asterick (\*), is the sender of commands 970-970N to a receiver MC device 110. This exchange is representative of any MC device-to-MC device connections from any two device out of the plurality of MC devices and is representative of MC device-to-central command computer connections.

FIG. 9 depicts the flow of commands 970-970N from a commanding MC device 110\* to a receiver MC device 110. The commands 970-970N are sent across the secure wireless network to receiving MC device 110, where the fusion engine 120 receives the commands. The fusion engine 120 relays the commands 970-970N to the corresponding sensor 910-910N. In order to send and/or receive a command, both the commanding MC device 110\* and receiver MC device 110 must download a plug-in 960-960N that corresponds to the sensor 910-910N receiving the command. The plug-in contains instructions that when processed permit a commanding MC device 110\* to send a command to the receiver MC device's 110 sensor. The plug-in 960-960N also permits the receiver MC device 110 to receive the command and then relay the command to the corresponding sensor 910-910N.

For example, a central command computer or MC device 1 wants to turn off sensor 1 that is connected and interfaced with MC device 2. The central command computer or MC device 1 sends the "off" command to across the secure network directed to MC device 2's sensor 1. MC device 2 will receive the "off" command and automatically transmit the "off" command to its sensor 1. In response to the command, Sensor 1 will turn off.

Commands sent to a to a receiving MC device 110 direct a sensor 910-910N and 940-940N to perform certain functions. The types of commands that a user can send depend on the type of sensor and the sensor's function. Therefore, each plug-in 960-960N may provide unique command capabilities tailored to corresponding sensor's function and device design. In some aspects, the command tells a sensor to turn on and/or turn off. The command may also direct a sensor to take a reading, such as read the current battery level of the sensor or read the current glucose level of the connected user of the MC device. In other aspects, the command may direct a sensor to move, such as when the sensor is a robot or an unmanned aerial vehicle. The command may also tell a sensor to operate in a certain mode, such as a battery saving mode. If the sensor is an airpack, the command may tell the airpack to switch from PAPR mode, which filters air from the environment to SCPA mode, which only draws air from an oxygen tank.

In other aspects, a commanding MC device 110\* is able to send a self-destruct command that clears the memory of a receiver MC device 110. This command is designed to prevent non-collaborators from accessing any data of the secure network. The self-destruct command may be activated when the receiver MC device 110 is lost, stolen, or the user is no longer participating in the collaboration.

EXAMPLES

Center Command Combat Operation

In a combat mission, three ground troops, including troop A, troop B, and troop C, of a special operations team are deployed to a potential combative area, and each troop has his/her own MC device, MC device A, MC device B, and MC device C respectively. The special operation team also team includes a commanding officer at a central command computer and an unmanned aerial vehicle (UAV) connected to an MC device. The troops' MC devices, the UAV's MC device, and the central command computer are connected to the secure wireless network, and bi-directional sensor output data exchange and bi-directional command exchange is established among all of the devices of the special operations team.

The MC device fixed to the UAV is connected and interfaced with a photo sensor that relays static imagery of the combative area to the in-flight UAV's MC device. The UAV transmits the photo sensor output data to each ground troop's MC device and to the central command computer. The central command computer receives the photo sensor output data. The photo sensor output data shows images of enemy combatants in the vicinity of the ground troops. With the knowledge gained from the UAV, the commanding officer warns the ground troops of the location of the enemy combatants via a text message. Even though troops' MC devices also received the photo sensor output data directly from the UAV, the text message provides an additional layer of communication to further ensure the troops are fully informed of their surroundings.

Each ground troop has a pulse rate monitor connected and interfaced with their MC device, and Troop A is carrying an medical dispensing device capable of sending and receiving radio frequency signals. During the operation, Troop B is hit by enemy fire that causes his pulse rate monitor to detect a pulse below normal. The pulse rate monitor sends the below normal pulse data to his MC Device B. The pulse rate monitor plug-in on MC Device B processes the pulse data into data packets, and recognizes the troop's pulse is below the normal range of the plug in's business logic. The MC device B then sends his pulse data packets to the other special operation devices. Because the pulse data is not normal, the pulse monitor output data is accompanied with a Status Bit 4 that further alerts those viewing the troop B's data that there is something wrong.

After receiving troop B's pulse data and accompanying alert, troop A knows troop B is injured and mobilizes to begin rescues efforts. Troop A, with the medical dispensing device, heads toward the location of the injured troop B, and sends a message to troop B, troop C, and the central command computer relaying his plan to initiate rescue efforts on location with troop B. Knowing troop A is going directly to the injured troop B for rescue efforts, troop C plans to secure the area around the injured troop B and relays such via a text message to the other team members. Both troop A and troop C use their MC devices to view the GPS location data and map view of injured troop B's MC device B in order to plan their routes accordingly. The GPS location data was collected from the inbuilt GPS sensor of the injured troop and is constantly updated due to XPRESS time interval setting. In addition, the commanding officer operating the central command computer requests for a doctor to aid him in supervising the operation in case medical commands are required. The commanding officer also dispatches a rescue helicopter to the location of injured troop B using the injured troop B's GPS location data.

Once the troop A locates the injured troop B, the commanding officer informs troop A via a phone call to turn on his medical dispensing device and attach the medical dispensing device to the injured troop. Turned on, the medical dispensing device equipped with radio frequency technology is able to receive commands via radio frequency signals through MC device A, that has downloaded a plug-in specific to the medical dispensing device. In light of the injured troop B's pulse sensor output data reading, the doctor determines that the injured troop B is in shock, and requires stabilizing medicine. From the central command computer, the doctor sends a command through MC device to the medical dispensing device to administer a specific drug of a specific quantity required to stabilize the injured troop B. The medical dispensing device receives the command and administers the life saving medicine to the injured troop B.

Home Health Care

The communication system allows health providers, such as doctors, home care nurses, parents, or caregivers to remotely monitor the health care of a patient or dependent. Due to the security measures of the secure wireless network, the communication system can send personal data in compliance with governmental regulations.

For example, an elderly patient has an MC device A connected to his caregiver's MC device C. The elderly patient's MC device A is connected and interfaced with multiple sensors. The sensors include a pulse monitor, a blood oxygen monitor, and a glucose monitor. The caregiver is granted permission to receive sensor output data of the pulse monitor, blood oxygen monitor, and glucose monitor and to send commands to each sensor.

The elderly patient relies on the glucose monitor to ensure he takes the recommended amount of insulin and does not go into diabetic shock. The elderly patient's glucose monitor sends out a Status Bit 2 to the connected MC devices. Upon receiving the Status Bit 2, the caregiver is immediately notified that the elderly patient's glucose monitor is either not communicating properly with MC device A or the glucose monitor is not working. When the caregiver goes to troubleshoot any potential problem of the glucose monitor, the caregiver realizes the glucose monitor has malfunction and is sending inaccurate glucose readings. As a result of the Status Bit 2, the caregiver promptly replaces the glucose monitor and the elderly patient does not miss his insulin shot. Instead of any detrimental effects that may result from relying on a malfunctioning glucose monitor, the communication system of the invention immediately alerted the caregiver of a potential problem with the elderly patient's medical device and allowed the caregiver to troubleshoot the problem before the elderly patient was injured as a result of the malfunction.

Certain details of a communication system and related methods according to the invention are described herein. Systems and methods according to the invention can include various combinations of what is described herein, whether or not those combinations are specifically identified. The invention is not limited to just the specific disclosed details.

The invention claimed is:

1. A system, comprising:
a plurality of mobile computing devices, each of the mobile computing devices including one or more sensors and also including a processor and computer-readable memory containing instructions which when executed by the processor cause the mobile computing device to:
form a secure wireless network with at least one other mobile computing device;
receive sensor output data from the mobile computing device's one or more sensors and then send at least some of that received sensor output data over the secure wireless network to at least one other mobile computing device on the secure wireless network; and
receive sensor output data over the secure wireless network from at least one other mobile computing device on the secure wireless network;
wherein at least one of the plurality of mobile computing devices is configured to be associated with a dog and at least one of that mobile computing device's one or more sensors provides sensor output data representative of a physiological aspect of the dog.

2. The system of claim 1 further comprising a central command computer.

3. The system of claim 1 wherein at least one of the mobile computing device's one or more sensors comprises an internal sensor.

4. The system of claim 3 wherein the internal sensor comprises an accelerometer.

5. The system of claim 1 wherein at least one of the mobile computing device's one or more sensors provides sensor output data representative of a location of the mobile computing device.

6. The system of claim 5 wherein the location is a geospatial location and provided in the form of a latitude and a longitude.

7. The system of claim 5 wherein the location includes an altitude.

8. The system of claim 5 further comprising a wireless access point device and wherein the location is with respect to the wireless access point device.

9. The system of claim 8 wherein the location is provided as a distance from the wireless access point device.

10. The system of claim 5 further comprising a device that produces a wireless beacon and wherein the location is with respect to the device.

11. The system of claim 10 wherein the location is provided as a distance from the device.

12. The system of claim 1 wherein at least one of the mobile computing device's one or more sensors provides sensor output data representative of a trajectory of the mobile computing device.

13. The system of claim 1 wherein the physiological aspect is the dog's body temperature.

14. The system of claim 1 wherein at least one of the mobile computing device's one or more sensors provides sensor output data representative of a condition of an environment in which the mobile computing device is located.

15. The system of claim 14 wherein the environmental condition is the quality of the air in the vicinity of the mobile computing device.

16. The system of claim 1 wherein the instructions contained within the computer-readable memory cause the mobile computing device to act as a decentralized engine that bi-directionally communicates over the secure wireless network with at least one other decentralized engine of another mobile computing device on the secure wireless network.

* * * * *